US 9,571,861 B2

(12) United States Patent
Siekmann et al.

(10) Patent No.: US 9,571,861 B2
(45) Date of Patent: Feb. 14, 2017

(54) DECODER, ENCODER, METHOD FOR DECODING AND ENCODING, AND DATA STREAM FOR A PICTURE, USING SEPARATE FILTERS

(71) Applicant: Fraunhofer-Gesellschaft zur Foerderung der angewandten Forschung e.V., Munich (DE)

(72) Inventors: Mischa Siekmann, Berlin (DE); Sebastian Bosse, Berlin (DE); Heiko Schwarz, Panketal (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 931 days.

(21) Appl. No.: 13/649,276

(22) Filed: Oct. 11, 2012

(65) Prior Publication Data

US 2013/0034159 A1 Feb. 7, 2013

Related U.S. Application Data

(63) Continuation of application No. PCT/EP2010/054823, filed on Apr. 13, 2010.

(51) Int. Cl.
*H04N 7/32* (2006.01)
*H04N 7/12* (2006.01)
(Continued)

(52) U.S. Cl.
CPC ............ *H04N 19/86* (2014.11); *H04N 19/117* (2014.11); *H04N 19/14* (2014.11); *H04N 19/147* (2014.11); *H04N 19/17* (2014.11); *H04N 19/176* (2014.11); *H04N 19/44* (2014.11); *H04N 19/46* (2014.11); *H04N 19/61* (2014.11); *H04N 19/80* (2014.11); *H04N 19/82* (2014.11)

(58) Field of Classification Search
None
See application file for complete search history.

(56) References Cited

U.S. PATENT DOCUMENTS

2003/0053541 A1* 3/2003 Sun ................... H04N 19/51
375/240.16
2006/0164410 A1* 7/2006 Li ........................ G06T 15/08
345/419

(Continued)

FOREIGN PATENT DOCUMENTS

EP 1944974 A1 7/2008
EP 2161936 A1 3/2010

(Continued)

OTHER PUBLICATIONS

Rao, et al., "current video coding standards: H.264/AVC, Dirac, AVS China and VC-1", IEEE 42nd Southeastern Symposium on System Theory (SSST), Piscataway, NJ, Mar. 7, 2010, pp. 1-8.

(Continued)

*Primary Examiner* — Christopher S Kelley
*Assistant Examiner* — Kaitlin A Retallick
(74) *Attorney, Agent, or Firm* — Michael A. Glenn; Perkins Coie LLP

(57) ABSTRACT

A decoder for decoding a picture is described, having: an extractor adapted to extract a first subset of syntax elements from a received data stream and a second subset of syntax elements being disjoint from the first subset of syntax elements, wherein the second subset of syntax elements has filter indication information defining a first filter for a first region of at least two different regions of the picture and a second filter for a second region of the at least two different regions of the picture; a pre-decoder adapted to pre-decode the picture based on the first subset of syntax elements to produce a reconstructed version of the picture; and a filter stage adapted to apply the first filter to the first region of the (Continued)

reconstructed picture to obtain a first filtered version of the reconstructed version of the picture and to apply the second filter to the second region of the first filtered version of the reconstructed version of the picture to obtain a second filtered version of the reconstructed version of the picture.

34 Claims, 16 Drawing Sheets

(51) Int. Cl.
    *H04N 19/86*     (2014.01)
    *H04N 19/176*     (2014.01)
    *H04N 19/147*     (2014.01)
    *H04N 19/46*     (2014.01)
    *H04N 19/61*     (2014.01)
    *H04N 19/117*     (2014.01)
    *H04N 19/14*     (2014.01)
    *H04N 19/17*     (2014.01)
    *H04N 19/44*     (2014.01)
    *H04N 19/80*     (2014.01)
    *H04N 19/82*     (2014.01)

(56) References Cited

U.S. PATENT DOCUMENTS

| | | | | |
|---|---|---|---|---|
| 2007/0031065 A1* | 2/2007 | Sun | ............ | H04N 19/61 |
| | | | | 382/299 |
| 2007/0160133 A1* | 7/2007 | Bao | ............ | H04N 19/105 |
| | | | | 375/240.1 |
| 2008/0232452 A1* | 9/2008 | Sullivan | ............ | H03H 17/0294 |
| | | | | 375/232 |
| 2009/0022220 A1* | 1/2009 | Vatis | ............ | H04N 19/176 |
| | | | | 375/240.12 |
| 2009/0238477 A1* | 9/2009 | Uchiyama | ............ | H04N 19/117 |
| | | | | 382/233 |
| 2009/0257493 A1* | 10/2009 | Ye | ............ | H04N 7/364 |
| | | | | 375/240.12 |
| 2010/0246692 A1* | 9/2010 | Rusanovskyy | ............ | H04N 19/46 |
| | | | | 375/240.29 |
| 2011/0222608 A1* | 9/2011 | Gao | ............ | H04N 19/176 |
| | | | | 375/240.24 |
| 2012/0092452 A1* | 4/2012 | Tourapis | ............ | H04N 19/597 |
| | | | | 348/43 |

FOREIGN PATENT DOCUMENTS

| | | | |
|---|---|---|---|
| EP | 2525576 A1 | 11/2012 | |
| JP | EP 1944974 A1 * | 7/2008 | ............ H04N 19/176 |
| WO | WO-2009/110160 | 9/2009 | |

OTHER PUBLICATIONS

Werner, , "Drift analysis and drift reduction for multiresolution hybrid video coding", Signal processing, Image Communication, vol. 8, No. 5, Elsevier Science Publishers, Amsterdam, NL, Jul. 1, 1996, pp. 387-409.

* cited by examiner

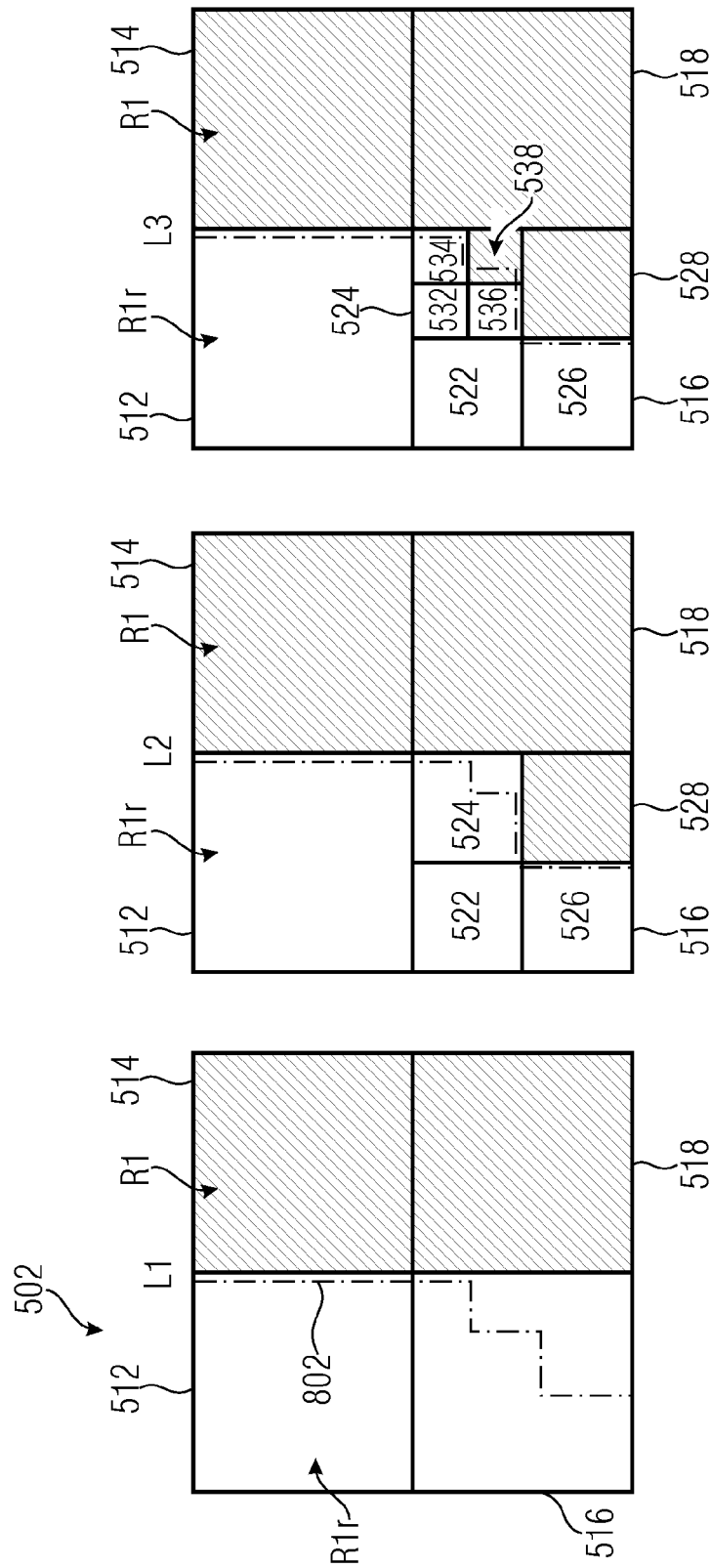

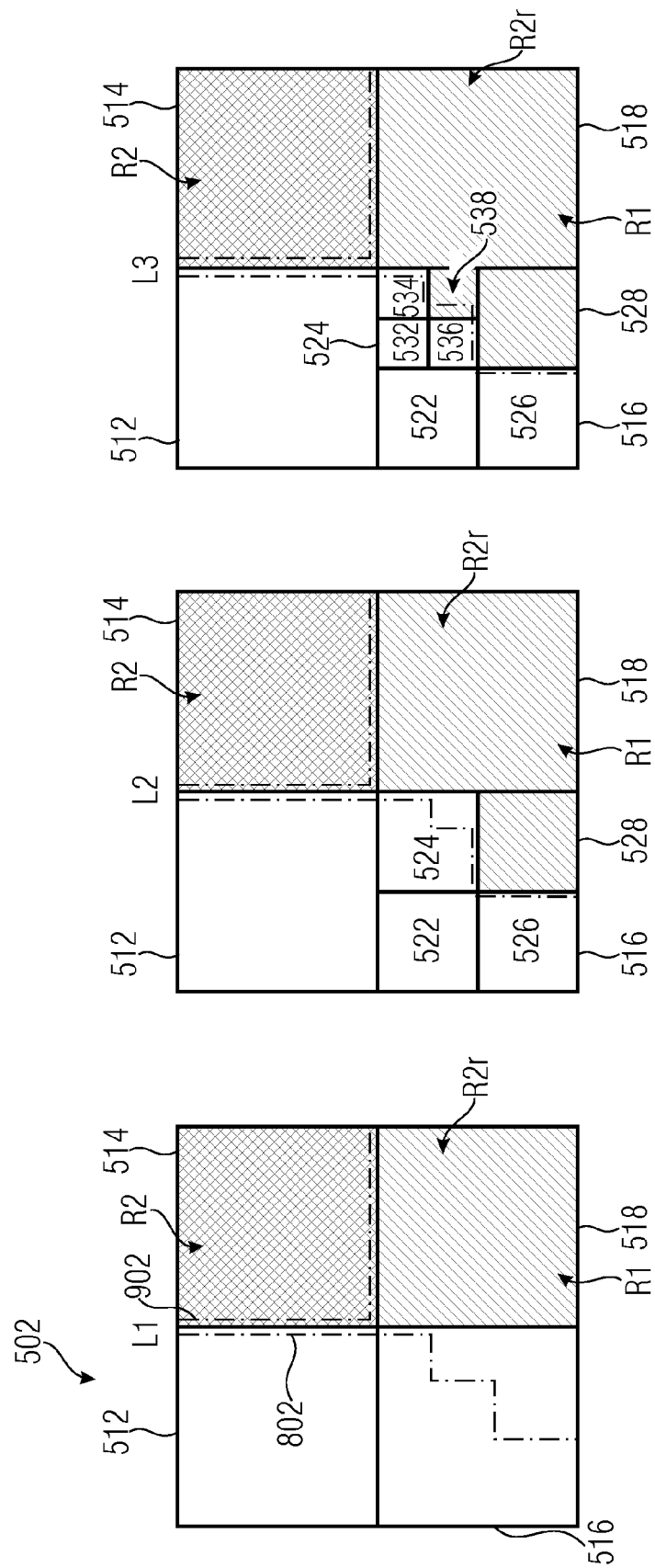

DECODER, ENCODER, METHOD FOR DECODING AND ENCODING, AND DATA STREAM FOR A PICTURE, USING SEPARATE FILTERS

CROSS-REFERENCE TO RELATED APPLICATIONS

This application is a continuation of copending International Application No. PCT/EP2010/054823, filed Apr. 13, 2010, which is incorporated herein by reference in its entirety.

BACKGROUND OF THE INVENTION

Embodiments of the present invention relate to the encoding and decoding of pictures, for example, still images and video pictures, and in particular to in-loop or post-filtering in such encoding and decoding schemes.

The MPEG-2 video coding standard developed primarily as an extension of prior MPEG-1 video capability with support of interlaced video coding was an enabling technology for digital television systems worldwide. It is widely used for the transmission of standard definition (SD) and High Definition (HD) TV signals over satellite, cable, and terrestrial emission and the storage of high-quality SD video signals onto DVDs. However, an increasing number of services and growing popularity of high definition TV are creating greater needs for higher coding efficiency. Moreover, other transmission media such as Cable Modem, xDSL or UMTS offer much lower data rates than broadcast channels, and enhanced coding efficiency can enable the transmission of more video channels or higher quality video representations within existing digital transmission capacities. Video coding for telecommunication applications has evolved through the development of the MPEG-2 coding standard and later through the development of the MPEG-4 coding standard and has diversified from ISDN and T1/E1 service to embrace PSTN, mobile wireless networks, and LAN/Internet network delivery.

In state-of-the-art hybrid video coding, image quality degradation caused by blockwise coding is reduced by applying an adaptive deblocking filter within the motion-compensated prediction loop, as described by Thomas Wiegand, Gary J. Sullivan, Gisle Bjontegaard, and Ajay Luthra in "Overview of the H.264/AVC Video Coding Standard", IEEE Tran. on Circuits and Systems for Video Technology, vol. 13, no. 7, pp. 560-576, July 2003, in the following referred to as [1]. The adaptive deblocking filter is applied to the edges of the prediction and/or transform blocks. Thereby blocking artifacts are reduced and both, subjective and objective picture quality can be improved. However, there is still a need to improve the subjective and objective picture quality.

SUMMARY

According to an embodiment, a decoder for decoding a picture may have an extractor adapted to extract a first subset of syntax elements from a received data stream and a second subset of syntax elements being disjoint from the first subset of syntax elements, wherein the second subset of syntax elements has filter indication information defining a first filter for a first region of at least two different regions of the picture and a second filter for a second region of the at least two different regions of the picture; a pre-decoder adapted to pre-decode the picture based on the first subset of syntax elements to produce a reconstructed version of the picture; and a filter stage adapted to apply the first filter to the first region of the reconstructed picture to acquire a first filtered version of the reconstructed version of the picture and to apply the second filter to the second region of the first filtered version of the reconstructed version of the picture to acquire a second filtered version of the reconstructed version of the picture.

According to another embodiment, an encoder for encoding a picture may have a pre-encoder adapted to pre-encode the picture into a first subset of syntax elements of a data stream; a filter stage adapted to subdivide the picture into at least two different regions; and a data stream inserter adapted to insert into the data stream a second subset of syntax elements being disjoint from the first subset of syntax elements, wherein the second subset of syntax elements has filter indication information defining a first filter for a first region of the at least two different regions and a second filter for a second region of the at least two different regions.

According to another embodiment, a method for decoding a picture may have the steps of extracting a first subset of syntax elements from a received data stream and a second subset of syntax elements being disjoint from the first subset of syntax elements, wherein the second subset of syntax elements has filter indication information defining a first filter for a first region of at least two different regions of the picture and a second filter for a second region of the at least two different regions of the picture; pre-decoding the picture based on the first subset of syntax elements to produce a reconstructed version of the picture; applying the first filter to the first region of the reconstructed picture to acquire a first filtered version of the reconstructed version of the picture; and applying the second filter to the second region of the first filtered version of the reconstructed version of the picture to acquire a second filtered version of the reconstructed version of the picture.

According to another embodiment, a method for encoding a picture may have the steps of pre-encoding the picture into a first subset of syntax elements of a data stream; subdividing the picture into at least two different regions; and inserting into the data stream a second subset of syntax elements being disjoint from the first subset of syntax elements, wherein the second subset of syntax elements has filter indication information defining a first filter for a first region of the at least two different regions and a second filter for a second region of the at least two different regions.

According to another embodiment, a data stream having data defining a picture may have a first subset of syntax elements having data of a pre-encoded version of the picture; and a second subset of syntax elements being disjoint from a first subset of syntax elements having filter indication information defining a first filter for a first region of at least two different regions of the picture and a second filter for a second region of the at least two different regions.

According to another embodiment, a decoder for decoding a picture may have a filter stage adapted to apply a first one-dimensional filter in a first direction to a reconstructed version of the picture to acquire a first filtered version of the reconstructed version of the picture, and to apply a second one-dimensional filter in a second direction to the first filtered version of the reconstructed version of the picture to acquire a second filtered version of the reconstructed version of the picture, wherein the second direction is different from the first direction.

According to another embodiment, an encoder for encoding a picture may have a filter stage adapted to apply a first one-dimensional filter function in a first direction to a reconstructed version of the picture to acquire a first filtered version of the reconstructed version of the picture, and to apply a second one-dimensional filter function in a second direction to the first filtered version of the reconstructed version of the picture to acquire a second filtered version of the reconstructed version of the picture, wherein the second direction is different from the first direction.

According to another embodiment, a method for decoding a picture may have the steps of applying a first one-dimensional filter in a first direction to a reconstructed version of the picture to acquire a first filtered version of the reconstructed version of the picture; and applying a second one-dimensional filter in a second direction to the first filtered version of the reconstructed version of the picture to acquire a second filtered version of the reconstructed version of the picture, wherein the second direction is different from the first direction.

According to another embodiment, a method for encoding a picture may have the steps of applying a first one-dimensional filter function in a first direction to a reconstructed version of the picture to acquire a first filtered version of the reconstructed version of the picture; and applying a second one-dimensional filter function in a second direction to the first filtered version of the reconstructed version of the picture to acquire a second filtered version of the reconstructed version of the picture, wherein the second direction is different from the first direction.

According to another embodiment, a computer program may have a program code for performing a method, when the program runs on a computer, for decoding a picture, which may have the steps of extracting a first subset of syntax elements from a received data stream and a second subset of syntax elements being disjoint from the first subset of syntax elements, wherein the second subset of syntax elements comprises filter indication information defining a first filter for a first region of at least two different regions of the picture and a second filter for a second region of the at least two different regions of the picture; pre-decoding the picture based on the first subset of syntax elements to produce a reconstructed version of the picture; applying the first filter to the first region of the reconstructed picture to acquire a first filtered version of the reconstructed version of the picture; and applying the second filter to the second region of the first filtered version of the reconstructed version of the picture to acquire a second filtered version of the reconstructed version of the picture.

An embodiment according to the first aspect of the invention provides a decoder for decoding a picture, comprising: an extractor adapted to extract a first subset of syntax elements from a received data stream and a second subset of syntax elements being disjoint from the first subset of syntax elements, wherein second subset of syntax elements comprises filter indication information defining a first filter for a first region of at least two different regions of the picture and a second filter for a second region of the at least two different regions of the picture; a pre-decoder adapted to pre-decode the picture based on the first subset of syntax elements to produce a reconstructed version of the picture; and a filter stage adapted to apply the first filter to the first region of the reconstructed picture to obtain a first filtered version of the reconstructed version of the picture and to apply the second filter to the second region of the first filtered version of the reconstructed version of the picture to obtain a second filtered version of the reconstructed version of the picture.

An embodiment according to the first aspect of the invention provides a method for decoding a picture, comprising: extracting a first subset of syntax elements from a received data stream and a second subset of syntax elements being disjoint from the first subset of syntax elements, wherein second subset of syntax elements comprises filter indication information defining a first filter for a first region f at least two different regions of the picture and a second filter for a second region of the at least two different regions of the picture; pre-decoding the picture based on the first subset of syntax elements to produce a reconstructed version of the picture; applying the first filter to the first region of the reconstructed picture to obtain a first filtered version of the reconstructed version of the picture; and applying the second filter to the second region of the first filtered version of the reconstructed version of the picture to obtain a second filtered version of the reconstructed version of the picture.

An embodiment according to the first aspect of the invention provides an encoder for encoding a picture, comprising: a pre-encoder adapted to pre-encode the picture into a first subset of syntax elements of a data stream; filter stage adapted to subdivide the picture into at least two different regions; and a data stream inserter adapted to insert into the data stream a second subset of syntax elements being disjoint from the first subset of syntax elements along with filter indication information defining a first filter for a first region of the at least two different regions and a second filter for a second region of the at least two different regions.

An embodiment according to the first aspect of the invention provides a method for encoding a picture, comprising: pre-encoding the picture into a first subset of syntax elements of a data stream; subdividing the picture into at least two different regions; and inserting into the data stream a second subset of syntax elements being disjoint from the first subset of syntax elements comprising filter indication information defining a first filter for a first region of the at least two different regions and a second filter for a second region of the at least two different regions.

An embodiment according to the first aspect of the invention provides a data stream comprising data defining a picture: a first subset of syntax elements comprising data of a pre-encoded version of the picture; and a second subset of syntax elements being disjoint from a first subset of syntax elements comprising filter indication information defining a first filter for a first region of at least two different regions of the picture and a second filter for a second region of the at least two different regions.

An embodiment according to the second aspect of the invention provides a decoder for decoding a picture, comprising: a filter stage adapted to apply a first one-dimensional filter in a first direction to a reconstructed version of the picture to obtain a first filtered version of the reconstructed version of the picture, and to apply a second one-dimensional filter in a second direction to the first filtered version of the reconstructed version of the picture to obtain a second filtered version of the reconstructed version of the picture, wherein the second direction is different from the first direction.

An embodiment according to the second aspect of the invention provides an encoder for encoding a picture, comprising: a filter stage adapted to apply a first one-dimensional filter function in a first direction to a reconstructed version of the picture to obtain a first filtered version of the reconstructed version of the picture, and to apply a second one-dimensional filter function in a second direction to the first filtered version of the reconstructed version of the picture to obtain a second filtered version of the reconstructed version of the picture, wherein the second direction is different from the first direction.

An embodiment according to the second aspect of the invention provides a method for decoding a picture, comprising: applying a first one-dimensional filter in a first direction to a reconstructed version of the picture to obtain a first filtered version of the reconstructed version of the picture; and applying a second one-dimensional filter in a second direction to the first filtered version of the reconstructed version of the picture to obtain a second filtered version of the reconstructed version of the picture, wherein the second direction is different from the first direction.

An embodiment according to the second aspect of the invention provides a method for encoding a picture, comprising: applying a first one-dimensional filter function in a first direction to a reconstructed version of the picture to obtain a first filtered version of the reconstructed version of the picture; and applying a second one-dimensional filter function in a second direction to the first filtered version of the reconstructed version of the picture to obtain a second filtered version of the reconstructed version of the picture, wherein the second direction is different from the first direction.

In accordance with a first aspect of the invention, the present application is based on the finding that the characteristics of a picture vary spatially within the picture and that applying different filters to different regions of the picture having different picture or sample characteristics allows to improve the picture quality of the reconstructed version of the picture, or in other words, allows to reduce the distortion of the reconstructed version of the picture with regard to the original picture. For simplicity reasons the reconstructed version of the picture is also referred to as reconstructed picture or just picture as it is typically apparent from the context whether the original version of the picture or the reconstructed version of the picture is referred to.

Objective picture or video quality metrics compute the quality difference or distortion by comparing, for example, every pixel or sample of the reconstructed picture to its corresponding pixel or sample in the original picture. The quality of digital picture or video processing systems can be evaluated, e.g. by calculating the signal-to-noise ratio (SNR) or the peak signal-to-noise ratio (PSNR) between the original picture or video signal and the reconstructed picture or video.

However, this increase of picture quality comes with an increase of information that needs to be transmitted from the encoder to the decoder and, thus, increases the rate or bandwidth of the transmission of the picture data.

Therefore, further embodiments according to the first aspect only apply a specific filter to a specific region of the picture if the improvement with regard to the picture quality outweighs or more than compensates the additional amount of side information needed for the specification of the filter and the additional amount of side information needed for the assignment of the samples of the reconstructed picture to the region to be filtered by the respective filter. In other words a compromise has to be found with regard to the achievable quality of the reconstructed picture and the needed rate. A criterion for the optimization of the coding efficiency is, for example, the rate distortion or rate distortion function.

Rate-distortion optimization is a method of improving image or video quality in video transmission/processing/compression systems taking both into account, the potential gain in picture quality and the additional rate needed to achieve quality gain. The name refers to the optimization of the amount of distortion (loss of image quality of the reconstructed image compared to the original image) against the amount of data needed to encode the image, i.e. the rate and the distortion.

In other words, former methods of making encoding decisions for image or video encoders were based on optimizing the encoding such that the highest quality image is provided after reconstruction. However, this decision criterion has the disadvantage that the choice might need more bits, while giving comparatively little quality gain. Rate-distortion optimization solves the aforementioned problem by acting as an image or video quality metric, measuring both the deviation from the original picture and the bit cost for each possible decision outcome. The bits are mathematically measured, for example, by multiplying the bit cost by a Lagrangian, a value representing the relationship between bit cost and quality for a particular quality level. The deviation from the original image is usually measured as the mean squared error (MSE) in order to maximize the peak signal-to-noise ratio (PSNR) image quality metric. Alternative methods for determining a measure for the deviation, which need less processing power compared to rate-distortion optimization are, for example, the simple sum of the absolute differences or the sum of absolute transformed differences.

Both, the additional filter indication information specifying the filter, e.g. the first or second filter, to be additionally applied to the reconstructed picture and the additional region indication information specifying the region, e.g. the first or the second region, to which the respective filter is to applied, increase the rate of the transmission.

Therefore, embodiments only transmit the additional information, i.e. the second subset of syntax elements, specifying the filter and the associated region to be filtered by the respective filter in case the rate distortion function of the coding including the regionally (spatially selectively) applied filter is better, i.e. lower, than the rate distortion function for the coding of the picture without applying the additional filter. The term "coding" is used as the generic term for encoding and decoding.

Embodiments of the encoder and the decoder may apply only two filters to the respective two different regions, or may apply these two filters to more than two different regions, i.e. re-use the first and/or second filter for other regions, or may apply more than two filters to more than two different regions with or without re-using one of the filters.

Further embodiments according to the first aspect and second of the invention are based on the finding that using one-dimensional filters instead of two-dimensional filters may reduce the distortion in certain regions of the reconstructed picture better than two-dimensional filters due to the specific predominant one-dimensional characteristics of those regions, or at least reduce the computational complexity compared to applying two-dimensional filters while at the same time improving the rate distortion compared to unfiltered reconstructed pictures. Furthermore, applying, for example, first a vertical one-dimensional filter and afterwards a second horizontal one-dimensional filter to the same region also provides a two-dimensional filter effect, however, with a reduced complexity compared to an application of a two-dimensional filter. Therefore, further embodiments according to the first and second aspect use one-dimensional filters as first and second filters with different directions or orientations, for example a horizontal one-dimensional filter as first filter and a vertical one-dimensional filter as second filter.

According to the first and second aspect of the invention, embodiments of the invention are based on the finding that applying two or more one-dimensional filters with different orientations or directions instead of a non-separable two-dimensional filter to the reconstructed picture (or at least parts or regions of the reconstructed picture) allows to reduce the complexity for determining the filter coefficients for these filters.

Embodiments of the present invention describe methods for adaptive in-loop filtering or post-filtering, which aim to improve the quality of coded and reconstructed pictures. Filter coefficients are estimated based, for example, on the correlation of the coded and reconstructed picture and the cross-correlation between the reconstructed and original picture. A reduction of complexity is achieved by using separable filters which can be applied as a cascade of one-dimensional filters in the horizontal and vertical direction. This leads to a reduction of computational operations needed for estimating the filter coefficients at the encoder and the filtering process itself.

Furthermore, the use of separable filters allows having distinct subdivisions of the reconstructed picture for the vertical and horizontal filter. Selectively applying the associated filter only to specific regions allows a better adaption to the structure and the local statistics of the given image or video signal. This can significantly improve coding efficiency.

Further embodiments comprise further techniques for improving coding efficiency, which do not rely on separable filters and thus can be applied for non-separable filters as well. Among them is the use of a more flexible filter design by adapting, e.g., parameters like filter length and/or filter symmetry. Pre-estimated filter sets may be reused or used to predict new sets of adapted filters to reduce the amount of side information and hence improve the coding efficiency. Filters may be estimated for the luma and each chroma plane separately. In order to reduce the side-information the same filter sets may be applied to regions of different planes.

In embodiments of the invention, adaptive filters or filter stages are used to improve the coding efficiency.

In an embodiment of the proposed structure, an arbitrary number of different filters may be applied to regions of the reconstructed picture. Each set of filter coefficients may be adaptively estimated in the encoder and may be transmitted to the decoder in the bit stream or data stream. This can lead to four different possibilities for each filter: (a) fixed filter length and fixed symmetry, (b) fixed filter length and adaptive symmetry, (c) adaptive filter length and fixed symmetry, and (d) adaptive filter length and adaptive symmetry.

One-dimensional filters may have a length of, e.g., 5 taps, two-dimensional filters may have a length o dimension of 5×5, 5×3 or any other filter length or combination of lengths (fixed or variable filter lengths). Adaptive filter lengths may be chosen by the encoder based on any optimization criteria.

The estimation of filters may follow a symmetric constraint. Thereby the number of coefficients can be reduced regarding their estimation and transmission. This leads to a reduction of complexity and, due to the reduction of side-information coding efficiency may be improved. Any symmetry is applicable to the adaptive filter.

The transmission of information regarding the employed filters can be done in multiple ways. A few exemplary possibilities are mentioned below. The employed filter coefficients can be directly transmitted or the filter coefficients can be predicted and the prediction residual may be transmitted in the bit stream. Furthermore, a set of possible filters can be stored in encoder and decoder and the indices of the used filters from the set can be predicted or signaled in the bit stream.

The filter coefficients may be predicted temporally, spatially, spatial-temporally, by a fixed predictor, based on the global statistics of filter coefficients or any other means of prediction.

In an embodiment the reconstructed image may subdivided into arbitrary overlapping or non-overlapping regions for regional filtering. Each of the regions may be processed by an appropriate filter of adaptive or fixed filter length and symmetry. Such a subdivision may be described by one, two or more quadtrees or any other definition of image subdivision, which also may be inferred from other image characteristics or previously made coding decisions such as prediction and/or residual coding modes. These definitions of subdivision may be entangled in order to reduce side-information.

Embodiments of the invention may also be adapted to reuse filters. In case of pictures composed of multiple (color) planes, the determination of filters can be done considering the primary plane group only or any combination of planes or plane groups. Filter sets for the luma and the two chroma planes can be estimated separately for each reconstructed plane and/or already estimated sets can be reused in other planes. Also, adaptive filters can be estimated using reconstructed luma plane samples only and applied for all planes of a picture.

Furthermore, the adaptive filters can be applied selectively to some planes only, keeping other planes unfiltered, e.g., adaptive in-loop/post filters can be applied to the luma plane while the two chroma planes remain unfiltered.

Additionally, already estimated filter sets may be used to predict new sets. Thus, side-information can be reduced. This method is not restricted to different planes, but may also be applied to filters of different image regions, slices, pictures, group of pictures or any other video sequence partition.

In an embodiment of the invention, filters may be estimated and applied as two-dimensional non-separable and/or two-dimensional separable filters. In the latter case, i.e. in case of separability of filters, a significant reduction in computational complexity can be obtained by convolving one one-dimensional filter in the horizontal direction and one one-dimensional filter in the vertical direction. Those may be estimated and applied independently or, for a better adaption to the signal characteristics, the filters may be estimated conditionally. Thereby, the filter for the first direction is estimated and applied. The estimation of the filter of the other direction is applied to this filter result. This technique may be applied repeatedly in an iterative way.

Usually, image structures differ in horizontal and vertical directions. Hence, the regional subdivision may be split as well in horizontal and vertical direction. The definition of the separable subdivision may be entangled. This may be implemented by two sets of quadtrees, one for each dimension, or any other description of regional subdivision.

The use of one-dimensional filters is not restricted to horizontal and vertical directions. They may also be applied in any other direction, e.g. in diagonal directions.

For embodiments of the invention the objective of the adaptation processes is to optimize the coding process and to improve the coding efficiency. This may be achieved by using a rate-distortion cost function as a measure of optimality.

Embodiments are described hereinafter, making reference to the appended drawings.

BRIEF DESCRIPTION OF THE DRAWINGS

Embodiments of the present invention will be detailed subsequently referring to the appended drawings, in which:

FIGS. 8A to 8C are exemplary quadtree partitions for the first region.

FIGS. 9A to 9C are exemplary quadtree partitions for the first region and the second region.

DETAILED DESCRIPTION OF THE INVENTION

Figure 1:
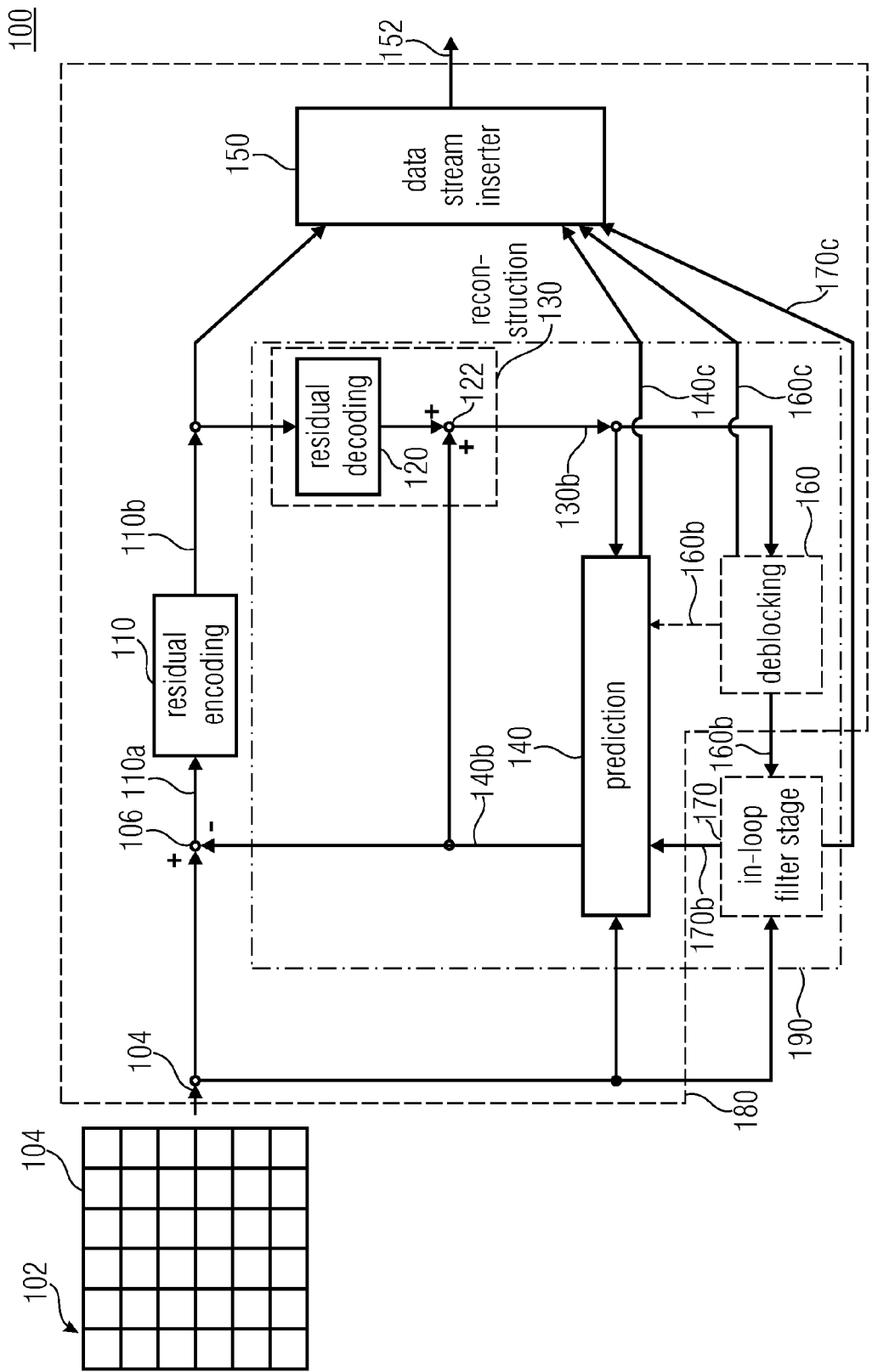
FIG. 1 is a block-diagram of an encoder with an in-loop filter stage.

Equal or equivalent elements or elements with equal or equivalent functionality are denoted by equal or equivalent reference numerals in the following description of the figures.

In the following embodiments of the invention based on coding schemes for block-based video coding using intra-prediction and inter-prediction will be described. These coding approaches are also called block-based hybrid video coding approaches. Each coded picture is represented in block-shaped units of associated luma and chroma samples called macroblocks. The basic source-coding algorithm is a hybrid of inter-picture prediction to exploit temporal statistical dependencies between different pictures or frames of the video and transform coding of the prediction residual to exploit spatial statistical dependencies. It should be noted that other video coding standards, other video coding schemes or still image coding schemes can also be used for embodiments of the present invention.

The human visual system seems to perceive scene content in terms of brightness and color information separately, and with greater sensitivity to the details of brightness than color. Video transmission systems can be designed to take advantage of this. This is true of conventional analog TV systems as well as digital ones. In H.264/AVC as in prior standards, this is done by using a YCbCr color space together with reducing the sampling resolution of the Cb and Cr chroma information. The video color space used by H.264/AVC separates a color representation into three components called Y, Cb, and Cr. Component Y is called luma, and represents brightness. The two chroma components Cb and Cr represent the extent to which the color deviates from gray toward blue and red, respectively. Because the human visual system is more sensitive to luma than chroma, H.264/AVC uses a sampling structure in which the chroma component has one fourth of the number of samples than the luma component (half the number of samples in both the horizontal and vertical dimensions). This is called 4:2:0 sampling with 8 bits of precision per sample. The sampling structure used is the same as in MPEG-2 Main-profile video.

Macroblocks are the basic building blocks of the MPEG standards and other standards. The basic coding algorithm for a macroblock is described after the following explanation of how macroblocks are grouped into slices.

Slices are a sequence of macroblocks which are processed in the order of a raster scan when not using flexible macroblock ordering (FMO). A picture may be split into one or several slices. A picture is therefore a collection of one or more slices in H.264/AVC. Slices are self-contained in the sense that given the active sequence and picture parameter sets, their syntax elements can be parsed from the bitstream and the values of the samples in the area of the picture that the slice represents can be correctly decoded without use of data from other slices provided that utilized reference pictures are identical at encoder and decoder. Some information from other slices may be needed to apply the deblocking filter across slice boundaries.

FMO modifies the way how pictures are partitioned into slices and macroblocks by utilizing the concept of slice groups. Each slice group is a set of macroblocks defined by a macroblock to slice group map, which is specified by the content of the picture parameter set and some information from slice headers. The macroblock to slice group map consists of a slice group identification number for each macroblock in the picture, specifying which slice group the associated macroblock belongs to. Each slice group can be partitioned into one or more slices, such that a slice is a sequence of macroblocks within the same slice group that is processed in the order of a raster scan within the set of macroblocks of a particular slice group. The case when FMO is not in use can be viewed as the simple special case of FMO in which the whole picture consists of a single slice group.

Using FMO, a picture can be split into many macroblock scanning patters such as interleaved slices, a dispersed macroblock allocation, one or more "foreground" slice groups and a "leftover" slice group, or a checker-board type of mapping.

The already available information about the slice boundaries which is sent within the first subset of syntax elements, therefore, may be also used to determine the first, second or any other region into which the picture is subdivided. Slice groups may also be used to independently code different objects in a single picture or a group of pictures. These objects may have particular visual characteristics which make them ideal candidates for applying filters specifically optimized for these objects or regions. In case of slice groups or objects appearing not only in one picture but in several pictures, the specific filter can be re-used for the other pictures also comprising the slice group or region.

Regardless of whether FMO is in use or not, each slice can be coded using different coding types as follows: I slice (a slice in which all macroblocks of the slice are coded using intra prediction), P slice (in addition to the coding types of the I slice, some macroblocks of the P slice can also be coded using inter prediction with at most one motion-compensated prediction signal per prediction block), B slice (in addition to the coding types available in a P slice, some macroblocks of the B slice can also be coded using inter prediction with two motion-compensated prediction signals per prediction block), SP slice (a so-called switching P slice that is coded such that efficient switching between different precoded pictures becomes possible) and SI slice (a so-called switching I slice that allows an exact match of a macroblock in an SP slice for random access and error recovery purposes).

Independent of FMO, at the encoder the input video signal is split into macroblocks, the association of macroblocks to slice groups and slices is selected, and then each macroblock of each slice is processed as described in the following. A efficient parallel processing of macroblocks is possible when there are various slices in the picture. All luma and chroma samples of a macroblock are either spatially or temporally predicted, and the resulting prediction residual is encoded using transform coding. For transform coding purposes, each color component of the prediction residual signal is, for example, subdivided into smaller 4×4 blocks. Each block is transformed using an integer transform, and the transform coefficients are quantized and encoded using entropy coding methods.

Each macroblock can be transmitted in one of several coding types depending on the slice-coding type. In all slice-coding types, the following types of intra coding are supported, which are denoted as Intra_4×4 or Intra_16×16 together with chroma prediction and I_PCM prediction modes. The Intra_4×4 mode is based on predicting each 4×4 luma block separately and is well suited for coding of parts of a picture with significant detail. The Intra_16×16 mode, on the other hand, does prediction of the whole 16×16 luma block and is more suited for coding very smooth areas of a picture. In addition to these two types of luma prediction, a separate chroma prediction is conducted.

In contrast to some previous video coding standards (namely H.263+ and MPEG-4 Visual), where intra prediction has been conducted in the transform domain intra prediction in H.264/AVC is conducted in the spatial domain, by referring to neighboring samples of previously-coded blocks which are to the left and/or above the block to be predicted. This may incur error propagation in environments with transmission errors that propagate due to motion compensation into inter-coded macroblocks. Therefore, a constrained intra coding mode can be signaled that allows prediction only from intra-coded neighboring macroblocks.

When using the Intra_4×4, each 4×4 block is predicted from spatially neighboring samples. The 16 samples of the 4×4 block which are labeled are predicted using prior decoded samples in adjacent blocks. For each 4×4 block one of nine prediction modes can be utilized. In addition to "DC" prediction (wherein one value is used to predict the entire 4×4 block), eight directional prediction modes are specified. Those modes are suitable to predict directional structure in a picture such as edges at various angles.

In addition to the intra macroblock coding types, various predictive or motion-compensated coding types are specified as P macroblock types. Each P macroblock type corresponds to a specific partition of the macroblock into the block shapes used for motion-compensated prediction. Partitions with luma block sizes of 16×16, 16×8, 8×16, and 8×8 samples are supported by the syntax. In case partitions with 8×8 samples are chosen, an additional syntax element for each 8×8 partition is transmitted. This syntax element specifies whether the corresponding 8×8 partition is further partitioned into partitions of 8×4, 4×8, or 4×4 luma samples and corresponding chroma samples.

The prediction signal for each predictive-coded M×N luma block is obtained by displacing an area of the corresponding reference picture, which is specified by a translations motion vector and a picture reference index. Thus, if the macroblock is coded using four 8×8 partitions and each 8×8 partition is further split into four 4×4 partitions, a maximum of sixteen motion vectors may be transmitted from a single P macroblock.

The accuracy of motion compensation is in units of one quarter of the distance between luma samples. In case the motion vector points to an integer-sample position, the prediction signal consists of the corresponding samples of the reference picture; otherwise, the corresponding sample is obtained using interpolation to generate non-integer positions. The prediction values at half-sample positions are obtained by applying a one-dimensional 6-tap FIR filter horizontally and vertically. Prediction values at quarter-sample positions are generated by averaging samples at integer- and half-sample positions.

Similar to previous video coding standards, H.264/AVC utilizes transform coding of the prediction residual. However, in H.264/AVC, the transformation is applied to 4×4 blocks, and instead of 4×4 discrete cosine transform (DCT), a separable integer transform with similar properties as a 4×4 DCT is used. Since the inverse transform is defined by exact integer operations, inverse-transform mismatches are avoided. The basic transform coding process is very similar to that of previous standards. At the encoder the process includes a forward transform, zig-zag scanning, scaling and rounding as the quantization process followed by entropy coding. At the decoder, the inverse of the encoding process is performed except for the rounding.

A quantization parameter is used for determining the quantization of transform coefficients in H.264/AVC. The parameter can take 52 values. These values are arranged so that an increase of 1 in quantization parameter means an increase of quantization step size by approximately 12% (an increase of 6 means an increase of quantization step size by exactly a factor of 2). It can be noticed that a change of step size by approximately 12% also means roughly a reduction of bit rate by approximately 12%.

The quantized transform coefficients of a block generally are scanned in a zig-zag fashion and transmitted using entropy coding methods. The 2×2 DC coefficients of the chroma components are scanned in raster-scan order. All inverse transform operation in H.264/AVC can be implemented using only additions and bit-shifting operation of 16-bit integer values. Similarly, only 16-bit memory accesses are needed for a good implementation of the forward transform and quantization process in the encoder.

Block-based video coding produces artifacts known as blocking artifacts. These can originate from both the prediction and residual difference coding stages of the decoding process. Block edges are typically reconstructed with less accuracy than interior pixels and "blocking" is generally considered to be one of the most visible artifacts with the present compression methods. For this reason, H.264/AVC defines an adaptive in-loop deblocking filter, where the strength of filtering is controlled by the values of several syntax elements. The blockiness is reduced, while the sharpness of the content is basically unchanged. Consequently, the subjective quality is significantly improved. The filter reduces bit rate typically by 5-10% while producing the same objective quality as the non-filtered video.

Application of an adaptive deblocking filter is a well-known method of improving the resulting video quality, and when designed well, this can improve both objective and subjective video quality. Bringing the deblocking filter within the motion-compensated prediction loop, this improvement in quality can be used in inter-picture prediction to improve the ability to predict other pictures as well.

FIG. 1 shows a block-diagram of an embodiment of an encoder 100 comprising a residual coding unit 110 or residual coder 110, a residual decoding unit 120 or residual decoder 120, a reconstruction unit 130 or reconstructor 130, a prediction unit 140 or predictor 140, a data stream insertion unit 150 or data stream inserter 150, an optional deblocking unit 160 or deblocker 160, and an in-loop filter stage 170.

In the following, the operation of the exemplary encoder 100 based on blockwise coding is described. The original picture 102 to be encoded is partitioned into a plurality of blocks, each block 104 comprising a fixed or variable number of pixels, each described by, for example, the YCbCr color space and a 4:2:2 sampling or any other sampling. In case the block is encoded without prediction, the residual coder 110 is adapted to receive the block or spatial domain representation of the block and to perform a transformation of the spatial domain representation or block samples to obtain a transformed version of the spatial domain representation, to optionally perform a scaling and to perform a quantization to obtain a quantized transformed representation of the block samples. The transformation performed by the residual encoder 110 can for example be a discrete Fourier transformation (DFT), a discrete cosine transformation (DCT), or a separable integer transform as previously described, or another spatial-to-frequency domain transformation or any other suitable transformation.

In case the block 104 is residual encoded 110 using prediction, a reference block 140b or a spatial domain representation of a reference block provided by the predictor 140 is subtracted at node 106 from the spatial domain representation of the block 104 to be encoded to obtain a spatial domain residual or a spatial domain residual representation 110a, which is residual encoded by the residual encoder 110, i.e. transformed, optionally scaled and quantized to obtain a quantized transformed representation of the residual 110b. Because typically the majority of the blocks is encoded using a prediction, intra-prediction or inter-prediction, for simplicity reasons the residual encoder 110 is referred to as "residual" encoder although, as described above, the residual encoder 110 is also adapted to encode in the same manner a spatial domain representation of the block 104 and the spatial representation of the block 104 or the residual is in general depicted by reference sign 110a, and the result of the transformation and quantization performed by the residual encoder 110 by the reference sign 110b. The transformed and quantized representation of the block 104 is received by the residual decoder 120 (for the naming, the same applies as for the "residual encoder"), which performs the inverse operations of the residual encoder 110 in an inverse order, for example performs an inverse quantization of the quantized transformed representation of the block, and additionally performs an inverse transformation to obtain a reconstructed spatial domain residual in case the block 104 has been prediction-encoded, or a reconstructed block or reconstructed version of the block 104 in case no prediction-encoding has been performed. In case prediction-encoding has been performed for the block 104, the reference block or the spatial representation of the reference block 140b is added to the reconstructed spatial domain residual at node 122 to obtain a reconstructed block or reconstructed representation of the prediction-encoded block 104. The reconstructed block or the reconstructed version of the block 104 is depicted by reference sign 130b.

The residual decoder 120 is adapted to perform the inverse transformation inverse to the transformation performed by the residual encoder, for example an inverse discrete Fourier transformation (IDFT), an inverse discrete cosine transformation (IDCS) or an inverse integer transform.

The predictor 140 is adapted to receive the reconstructed version or representation of block 104 and to obtain, based on inter-prediction or intra-prediction procedures as described above, a reference block 140b or spatial representation of a reference block 140b that is typically the best match of a block encoded and reconstructed prior to the actual block 104 to be encoded, or a representation of a block obtained by interpolation using previously encoded and reconstructed blocks of the same picture (intra-coding) or of a previously encoded and reconstructed picture (inter-prediction). To obtain the optimum match, the predictor 140 is adapted to receive the original block to be encoded 104 and to compare the block to be encoded 104 with potential reference block candidates. Using a reference block 140b to obtain a spatial domain residual 110a at node 106 allows reducing the amount of data to be encoded and to thus improve the coding efficiency. The better the reference block 140b coincides or matches with the block 104 to be encoded, the smaller the residual and the higher the potential coding efficiency gain.

As mentioned previously, the blockwise prediction leads to blocking artifacts which can be reduced by applying a deblocking filter 160 to the reconstructed picture. The filter coefficients of the deblocking filter 160 can, for example, be determined by minimizing the mean square error between the original picture samples and the samples of the reconstructed unblocked picture. The deblocked picture 160b can for example be provided to the predictor 140 to improve the inter-prediction performed by predictor 140.

The data stream inserter 150 is adapted to receive the payload data, for example the transformed quantized representation of the block 104 or the residual thereof, the residual encoding side information like transformation parameters, scaling parameters and/or quantization parameters, to receive the prediction parameters 140c from the predictor 140, for example information about the prediction mode, inter- or intra-prediction, the reference block number or index, the reference picture number or index, interpolation parameters, etc., and deblocking parameters, for example filter coefficients, from the deblocker 160. The data stream inserter 150 is further adapted to insert this payload and side information as a first subset of syntax elements into a data stream 152.

The data stream inserter furthermore can comprise an entropy encoder to encode the first subset of syntax elements and the second subset of syntax elements, for example context-adaptive binary arithmetic coding (CABAC), context-adaptive variable-length coding (CAVLC) or any other entropy coding.

In other words, the residual encoder 110, the residual decoder 120, the reconstructor 130, the predictor 140, the data stream inserter 150 and the optional deblocker 160 form a pre-encoder which may be adapted to pre-encode the picture 102 by any suitable encoding scheme, for example, but not limited to, MPEG-1, MPEG-2, MPEG-4, H.26x.

According to a first embodiment, the encoder 100 comprises a subdivider or filter stage 170 that is adapted to subdivide the picture 102 or the reconstructed version of the picture 102 into at least two different regions and a data stream inserter 150 adapted to insert into the data stream 152 a second subset of syntax elements 170c being disjoint from the first subset of syntax elements 110b, 140c and 160c along with future indication information defining a first set of filter coefficients for a first region of the at least two different regions of the reconstructed picture and a second set of filter coefficients for a second region of the at least two different regions of the reconstructed picture or picture 102.

The individual reconstructed blocks may be stored in a buffer, for example until all blocks of the picture have been reconstructed, so that the buffer stores the reconstructed pictures in a blockwise manner. The buffer may be part of the predictor or may be separate unit. The filter stage 170 can be adapted to obtain the whole reconstructed picture from the buffer.

In other words, the encoder 100 comprises a pre-encoder 180 formed by the residual encoder 110, the residual decoder 120, the reconstructor 130, the predictor 140 and the data stream inserter 150 and, optionally, the deblocker 160, wherein the pre-encoder 180 is adapted to pre-encode the picture 102 into a first subset of syntax elements of a data stream 152, the first subset of syntax elements comprising the payload of the residual encoder 110, the residual encoding parameters, the prediction parameters or side information 140c and, optionally, the deblocking parameters 160c.

According to the first aspect, one embodiment of the filter stage 170 may only comprise a subdivider adapted to subdivide the picture into a first and a second region, which are different from each other, and to assign the first region to a first filter or vice versa, and to assign the second region to the second filter or vice versa. The first and the second filter may be one-dimensional filters or two-dimensional filters. Such embodiments of the encoder already allow an improved adaptation of filters applied to the reconstructed picture, taking into account possibly different local statistics or characteristics of the picture or reconstructed picture. The first and the second region can be determined allowing an overlap of the first and the second region, or as additional constraint non-allowing an overlap of the first and the second region.

In a further embodiment, the encoder 100 is adapted to determine third or even further additional regions, overlapping or not overlapping with the first or second or other regions, wherein the filter stage or subdivider 170 can be further adapted to assign to each region a different set of filter coefficients or to reuse for the third and other regions the first or second or any other further set of filter coefficients.

As described previously, and as will be described in more detail later, the filter stage 170 or the subdivider 170 forming a part of the filter stage 170 can be an adaptive filter stage 170, which is adapted to determine an optimum set of filter coefficients for the first set of filters based on an optimization algorithm (e.g. mean square error minimization) with or without constraints like e.g. symmetry constraints or length constraints, or to determine an optimum set of filter coefficients for the first and second sets of filter coefficients from a plurality of predetermined sets of filter coefficients. The term "plurality" is to be understood as two or more.

The filter stage or subdivider 170 can be arranged in the prediction loop 190 (see dot-hashed line) comprising besides the filter stage 170 the residual decoder 120, the reconstructor 130, the predictor 140 and, optionally, the deblocker 160, or as post-filter stage or out-of-loop filter stage (not shown in FIG. 1). Implementing the filter stage 170 and in particular the adaptive filter stage as in-loop filter stage, the filtered reconstructed picture 170b can be output from the in-loop filter stage to the predictor 140 to, thus, further improve the prediction and residual encoding for other pictures. In case the filter stage or subdivider 170 is implemented as out-of-loop filter stage, the filter stage outputs, for example only outputs, the second subset of syntax elements comprising the future indication information and the assignment of the different regions to the different filter sets 170c. In this case, no filtered reconstructed picture 170b is fed back to the predictor 140 and the predictor 140 produces the reference block 140b, for example, based on the reconstructed blocks 140b or the deblocked reconstructed picture 160b.

In further embodiments according to the first aspect, the filter stage 170 may replace the deblocker 160 or may be arranged prior to the deblocker 160 so that the deblocker 160 performs a deblocking filtering of the filtered version of the reconstructed picture filtered by the filter stage 170. Again, the filter stage 170 may be an in-loop filter stage or an out-of-loop filter stage.

According to the second aspect of the invention, the encoder 100 for encoding a picture 102 comprises a filter stage 170 adapted to apply a first one-dimensional filter function in a first direction to a reconstructed version of the picture to obtain a first filtered version of the reconstructed version of the picture, and to apply a second one-dimensional filter function in a second direction to the first filtered version of the reconstructed version of the picture to obtain a second filtered version of the reconstructed version of the picture, wherein the second direction is different from the first direction.

The filter stage 170 can be an in-loop filter stage 170 as shown in FIG. 1 arranged in the prediction loop 190 of the encoder 100, or be implemented as out-of-loop filter stage or post-filter stage as explained with regard to the first aspect of the invention. Furthermore, embodiments of the filter stage according to the second aspect can be adaptive filter stages (in-loop or post-loop) and can for example be adapted to determine the filter coefficients for the first one-dimensional filter and for the second one-dimensional filter using optimization algorithms with or without constraints, for example with regard to symmetry or length, or can be adapted to select an optimum set of filter coefficients for the first one-dimensional filter and the second one-dimensional filter from a plurality of predetermined sets of filter coefficients.

Accordingly, the explanations with regard to embodiments according to the first aspect also apply to embodiments according to the second aspect, except that encoders according to the second aspect apply the first filter and the second filter to the whole reconstructed picture or at least to the same region of the reconstructed picture.

As mentioned previously, encoders according to the second aspect of the invention allow to reduce the complexity for adapting the filter coefficients or determining the filter coefficients compared to encoders using non-separable, two-dimensional filters, and also reduce the complexity with regard to performing the filter operation itself due to their long-dimensionality, however, by cascading the two one-dimensional filters, still a two-dimensional filter effect is achieved.

Figure 2:
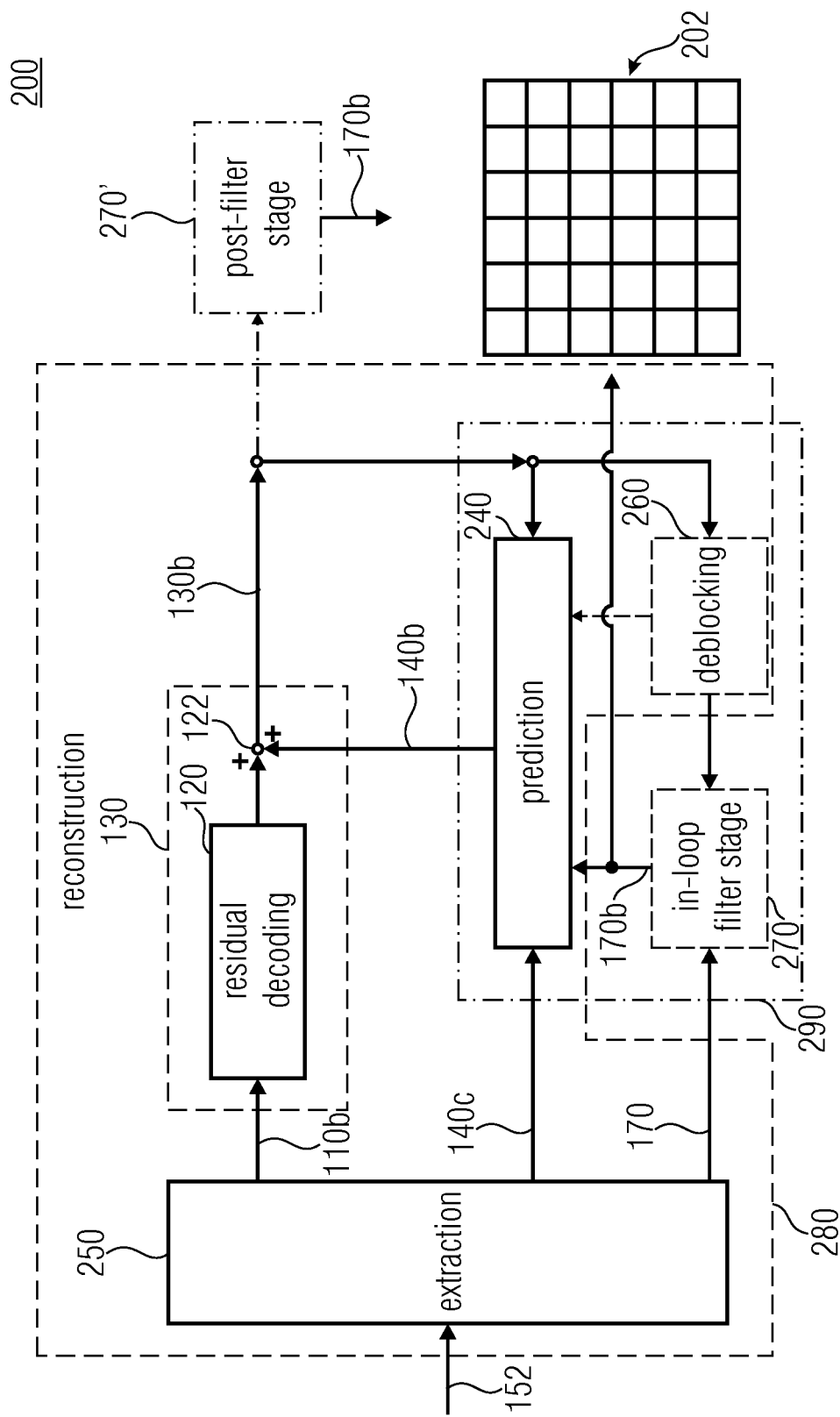
FIG. 2 is a block-diagram of an embodiment of a decoder with a filter-stage implemented as in-loop filter stage or post-filter stage.

FIG. 2 shows a block diagram of a decoder comprising a pre-decoder 280 and a filter stage 270. The pre-decoder comprises an extraction unit 250 or extractor 250, a residual decoder 120 or residual decoding unit 120, a reconstruction unit 130 or reconstructor 130, a prediction unit 240 or predictor 240 and an optional deblocking unit 260 or deblocker 260.

The pre-decoder 280 comprises the extractor 250, the reconstructor 130 again comprising the residual decoder 120, and the predictor 240 and, optionally, the deblocker 260. The pre-decoder 280 operates in a similar manner as the prediction loop 180 of the encoder 100 (with regard to the reconstructing and decoding of the coded picture).

The extractor 250 is adapted to receive the data stream 152 for example from an encoder 100 as explained based on FIG. 1. The extraction unit is adapted to extract from the data stream 152 the payload and the side information or parameters, for example the residual coding parameters, the prediction parameters 140c, and, optionally, the deblocking parameters of the deblocking filter (not shown). The extractor 250 can also comprise an entropy decoder to decode the data stream 152. The payload, the quantized transformed residual data 110b is decoded by the residual decoder 120 by for example performing the inverse coding steps in an inverse manner that have been performed by the residual encoder 110 of the encoder 100. In other words, the residual decoder 120 can be adapted to perform the same processing steps as a residual encoder 120 of the encoder 100, e.g. inverse quantization of the transformed quantized residual and inverse transforming to obtain the reconstructed spatial domain representation of the packet 104 in case no prediction has been performed by the encoder when encoding the block 104 or to obtain the reconstructed version of the spatial domain residual of the block 104 in case the block 104 has been prediction-encoded. In the latter case, at node 122, the reference block or representation of the reference block 140b provided by the predictor 140 is added at node 122 to the reconstructed spatial domain residual to obtain the reconstructed block or reconstructed representation or version of the block 140b. The predictor 140 is adapted to receive the reconstructed block 130b and to produce a reference block or representation of a reference block 140b based on the reconstructed block or reconstructed blocks 130b and the prediction parameters 140c for a next block to be prediction-decoded. As explained with regard to the encoder 100, the decoder 200 or pre-decoder 280 may comprise for example a buffer to store the reconstructed blocks and to perform a deblocking filtering by the deblocker 260 to a reconstructed picture.

In other words, the pre-decoder forms the complete decoder 200 except for the filter stage 270, and is adapted to pre-decode the picture based on the first subset of syntax elements to produce a reconstructed version of the picture, which is further decoded, i.e. filtered, to produce the filtered reconstructed version of the picture to be output 202 by the decoder.

According to a first aspect of the invention, the decoder 200 additionally comprises a filter stage 270 adapted to apply a first set of filter coefficients to a first region of the reconstructed picture and a second set of filter coefficients to a second region of the reconstructed picture. In addition, the extractor 250 is adapted to not only extract the first subset of syntax elements comprising the payload and the side information for the residual decoder, the side information 140c for the predictor and, optionally, the side information for the deblocker 260, but also extract a second subset of syntax elements being disjoint from the first subset of syntax elements along with filter indication information defining the first set of filter coefficients for a first region of the at least two different regions and the second set of filter coefficients for the second region of the at least two different regions.

The filter stage 270 can be implemented as an in-loop filter stage being arranged in the prediction loop 290 of the decoder as shown in FIG. 2, or as post-filter stage 270' (see hash-dotted line in FIG. 2). In case the filter stage 270 is used as in-loop filter stage, the improved filtered reconstructed picture 170b can be provided to the predictor 240 to improve the prediction for consecutive blocks to be decoded. In case the filter stage is implemented as post-filter stage 270', the improved filtered reconstructed picture 170b is not fed back to the predictor 240. This increases the decoding speed, because the predictor 240 does not have to wait until the filter stage 270 has filtered the reconstructed picture to predict the next blocks. Both processes, the prediction 240 and the post-filtering 270', can be performed in parallel.

According to the second aspect of the invention, the filter stage 270 or 270' is adapted to apply a first one-dimensional filter function in a first direction to the reconstructed version of the picture to obtain a first filtered version of the reconstructed version of the picture, and to apply a second one-dimensional filter function in a second direction to the first filtered version of the reconstructed version of the picture to obtain a second filtered version of the reconstructed version of the picture, wherein the second direction is different from the first direction.

As explained with regard to the encoder of FIG. 1, the use of two one-dimensional filters instead of one two-dimensional filter reduces the complexity of the filter operation itself while at the same time providing a two-dimensional filter effect.

Although embodiments of the encoder and decoder have been described, which encode and decode pictures based on blocks as basic building blocks, other embodiments of the encoder and decoder may use other basic elements for subdividing and/or representing the picture and for inter- or intra-encoding and/or -decoding the picture. In particular, embodiments of the encoder and decoder may use blocks of variable size, may use different block sizes for prediction and transformation. Instead of the YCbCr color space and the 4:2:0 or other samplings, embodiments of the encoder and decoder may use an RGB (red-green-blue) color scheme for sampling the picture.

In the following, embodiments of the encoder according to the first aspect will be described in more detail. However, it should be noted that the explanations with regard to the application of one-dimensional filters and the corresponding advantages also apply to embodiments according to the second aspect in a corresponding manner. As explained previously, when applying an additional in-loop filter stage 170, 270 or a post-loop filter stage 270' the gain with regard to the quality of the reconstructed picture or the reduction of the distortion of the reconstructed picture has to be weighed or balanced against the additional amount of side information, e.g. the second subset of syntax elements, needed to specify on the one hand the filters themselves, for example the filter type (one-dimensional or two-dimensional, horizontal or vertical), the length and/or dimension, and on the other hand the regions themselves or the assignment of samples to the regions.

One possibility to minimize the amount of information needed to indicate which filter is to be applied is using a set of predetermined filters or filter functions and identifying each of the filters by a unique index. The index may refer to one-dimensional, two-dimensional filters, and filters of any length or dimension. The amount of information needed to identify the filter is, for example, only determined by the number of different filters included in the set of predetermined filters. The encoder and the decoder each already have stored the different filters and the associated indices so that the encoder only has to submit the index as second syntax element to the decoder to identify the filter or set of filter coefficients.

Further embodiments comprise an adaptive in-loop filter stage 170 that is adapted to determine the filter coefficients by minimizing the mean square error (MSE) between the original picture 102 and the reconstructed version of the picture and potentially deblocked version 160b of the reconstructed picture. By minimizing the mean square error, the distortion of the reconstructed picture after filtering by the filter stage with the determined filter coefficients is reduced. For the calculation of the mean square error, the mean square error for the respective samples or pixel values of the original picture 102 and the respective samples or pixel values of the reconstructed picture is determined. The mean square error reduces the residual between the pixels or samples of the original picture and the reconstructed picture. This optimization or minimization of the mean square error is performed by calculating the autocorrelation of the samples of the reconstructed and potentially deblocked picture and a cross-correlation between the samples of the reconstructed and potentially deblocked picture and the samples of the original picture. As filter, an adaptive Wiener Filter or any other suitable filter to cope with picture degradation, for example, by Gaussian noise, blurring or distortion can be used. Such adaptive filter stages allow to improve the coding efficiency by modeling the compression effect of coding loss as random noise added to the original input samples or pixels, and the coding residual is reduced by the utilization of the adaptive filter, for example an adaptive Wiener filter 170 in addition to the optional deblocking.

Moreover, for an M×N two-dimensional filter, M×N different filter coefficients have to be determined and transmitted with the second subset of syntax elements as filter indication information. To reduce the amount of filter indication information needed to specify the whole filter (first or second filter), the length or dimension of the filter can be limited and/or a filter symmetry can be imposed on the optimization of the filter coefficients as additional constraint. In particular imposing a symmetry or symmetric constraint on the filter optimization allows keeping the length or dimension of the filter at a reasonable level and at the same time reducing the number of different filter coefficients to be transmitted as side information along the second subset of syntax elements.

Figures 3A, 3B, 3C, 3D:
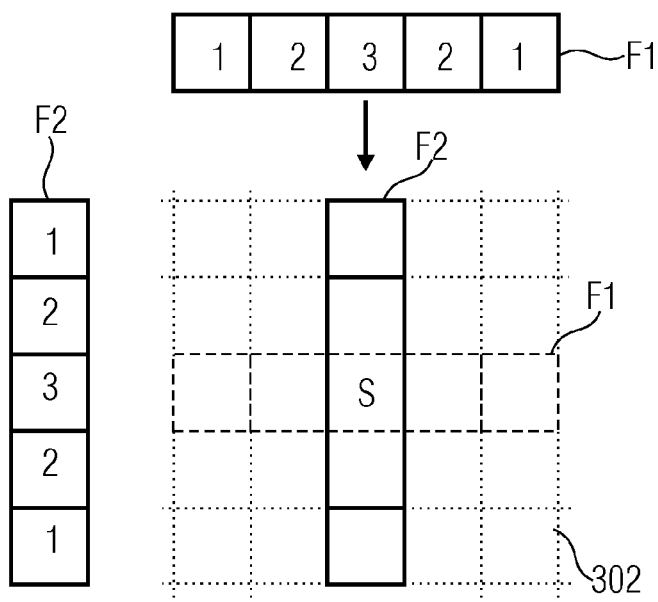
FIGS. 3A and 3B are two embodiments of symmetric two-dimensional filters.
FIG. 3C shows an embodiment of a one-dimensional symmetric filter.
FIG. 3D is the cascaded application of two one-dimensional filters with orthogonal orientation with regard to each other.

FIGS. 3A and 3B show two different 5×5 two-dimensional filters with 25 filter taps j=1 . . . 25 (only some are exemplarily depicted in FIG. 3A). The numbers in the fields of the filter matrix refer to the filter coefficients with different filter coefficient values, in FIG. 3A referred to with index i. As can be seen, only six different filter coefficient values (i=1 . . . 6) are needed to define the two-dimensional symmetric filter shown in FIG. 3A. In FIG. 3B, only nine different filter coefficient values (i=1 . . . 9) are used to specify the two-dimensional symmetric filter with 25 filter taps. In both cases the amount of information needed to specify the filter and the amount of information to be transmitted as second subset of syntax elements can be reduced.

FIG. 3A shows a point-symmetric two-dimensional filter being symmetric to the center (i=6 or j=13). FIG. 3B shows another embodiment of a point-symmetric two-dimensional filter symmetric to the center tap j=13, however, compared to the two-dimensional filter in FIG. 3A less filter coefficient values are reused for the different filter taps.

Two-dimensional filters may have any point-symmetry or axis-symmetry or any other symmetry. In even further embodiments, filters may have no symmetry at all but may still reduce the amount of information needed to transmit the set of filter coefficients by reusing filter coefficient values at certain filter taps.

FIG. 3C shows a one-dimensional symmetric filter with five filter taps (j=1 . . . 5) and a point or axis symmetry with regard to the center tap j=3. One-dimensional filters used by embodiments of the invention may also have any one-dimensional symmetry or no symmetry at all, but may reuse filter coefficient values at different filter taps to reduce the amount of side information needed to specify a set of filter coefficients (for the first and the second filter).

As can be seen from FIGS. 3A to 3C, for each filter operation of one sample or pixel of the reconstructed picture for the two-dimensional filters 25 multiplications and 24 additions are needed to calculate the filtered sample value for each sample. In contrast thereto, for the one-dimensional filter as shown in FIG. 3C, only five multiplications and four additions are needed to calculate the filtered sample value. Even applying now a second one-dimensional filter to the same sample in total only needs ten multiplications and eight additions compared to the 25 multiplications and 24 additions of the two-dimensional filter. Therefore, applying two one-dimensional filters in a cascaded manner reduces the complexity of performing the filter operation.

FIG. 3D shows the application of two one-dimensional filters in a cascaded manner to a reconstructed version 302 of the picture. The different samples or blocks are shown by dots. The first filter F1 is a one-dimensional filter applied in horizontal orientation or direction, and is shortly referred to as horizontal one-dimensional filter F1, and the second filter F2 is a one-dimensional filter applied in vertical direction or orientation, and is shortly referred to as vertical one-dimensional filter. In a first step, the first filter F1 is applied to the sample S to produce a first filtered version of the sample S. Afterwards, the second filter F2 is applied to the first filtered version of sample S to obtain the second filtered version of the sample S. As can be seen from FIG. 3D for the determination of the second filtered version of the sample S, by applying the filter F1, other horizontally neighboring sample values have been used to determine the first filtered version of the sample, and when applying the second filter vertically neighboring sample values have been used to determine the second filtered version of the sample S. Therefore, the application of two one-dimensional filters with different directions or orientations also provides a two-dimensional filtering effect, however, at dramatically reduced processing effort. Although the first filter F1 and the second filter F2 show two one-dimensional filters which have the same symmetry and use the same filter coefficient values at the corresponding filter taps, and only differ with regard to their orientation or direction, further embodiments of the encoder and decoder may apply one-dimensional filters with different lengths, different symmetries, different filter coefficient values despite having the same symmetry, etc., as needed. Even further embodiments may also combine the application of one-dimensional filters and two-dimensional filters.

Although FIG. 3D shows the application of first a horizontal one-dimensional filter and second a vertical one-dimensional filter, in alternative embodiments first a vertical one-dimensional filter may be applied and afterwards a horizontal one-dimensional filter. In even further embodiments, the orientation or direction of the first one-dimensional filter and the second one-dimensional filter do not need to be orthogonal to each other as shown in FIG. 3D, and may also not be limited to horizontal or vertical filters, but may comprise diagonal filters with different dips or inclinations.

The filter symmetry can already be imposed on the filter as constraint during the mean square error optimization. In other embodiments, a mean square error optimization without symmetry constraints is performed and afterwards, by a kind of quantization, the resulting filter is mapped to a best-matching filter symmetry and the respective different filter coefficient values according to the best-matching symmetric filter are obtained.

The different symmetries of the filter, for example as shown in FIGS. 3A to 3C, can again be identified by unique identifiers known to the encoder and decoder to reduce the amount of information needed to define the base filter, and only the different filter coefficient values according to the symmetric base filter structure are additionally indicated in the second subset of syntax elements.

As mentioned earlier, embodiments subdivide the reconstructed picture into arbitrary overlapping or non-overlapping regions. Each of the regions may be processed by an appropriate filter of adaptive or fixed filter length and/or symmetry.

Figure 4A:
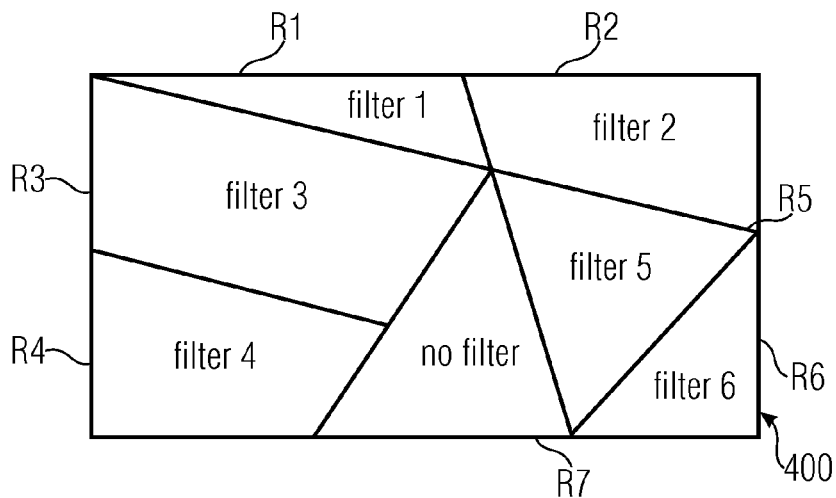
FIG. 4A is an exemplary subdivision of a reconstructed picture with different filters for different regions.

FIG. 4A shows an exemplarily subdivision of a reconstructed picture 400 in seven different and non-overlapping regions R1 to R7, wherein region R1 is filtered by filter 1, region R2 is filtered by filter 2, region R3 is filtered by filter 3, region R4 is filtered by filter 4, region R5 is filtered by filter 5, and region R6 is filtered by filter 6, and region R7 is not filtered at all. In other words, FIG. 4A shows an embodiment, wherein the reconstructed picture is subdivided into non-overlapping regions, wherein each region is filtered by a different filter, due to differing local picture characteristics.

Figure 4B:
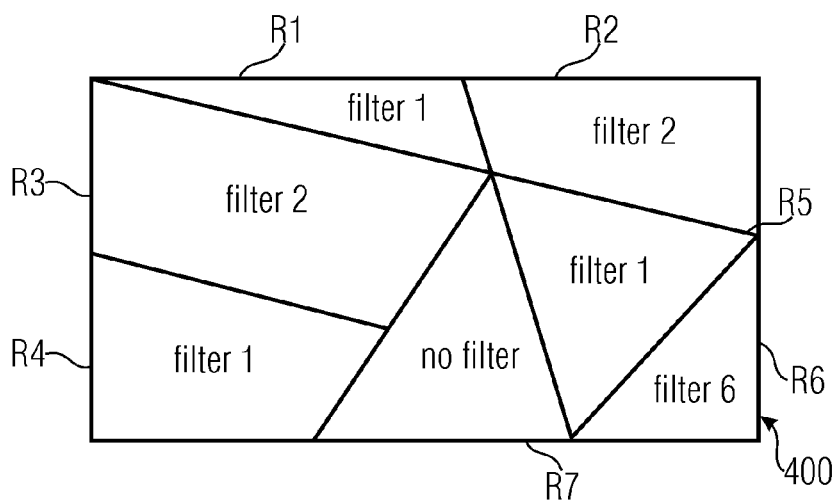
FIG. 4B is an exemplary subdivision of a reconstructed picture with a reuse of filters for specific regions of the reconstructed picture.

FIG. 4B shows the same reconstructed picture 400 with the same subdivision within the picture plane as shown in FIG. 4A, however, in certain regions the filters are reused. As can be seen from FIG. 4B, the first filter 1 (F1) is not only used for region R1, but is reused for region R4 and region R5. The second filter 2 (F2) is not only applied to region R2, but also to region R3. Region R6 is still filtered with filter 6 and region R7 is again not filtered at all.

Figure 4C:
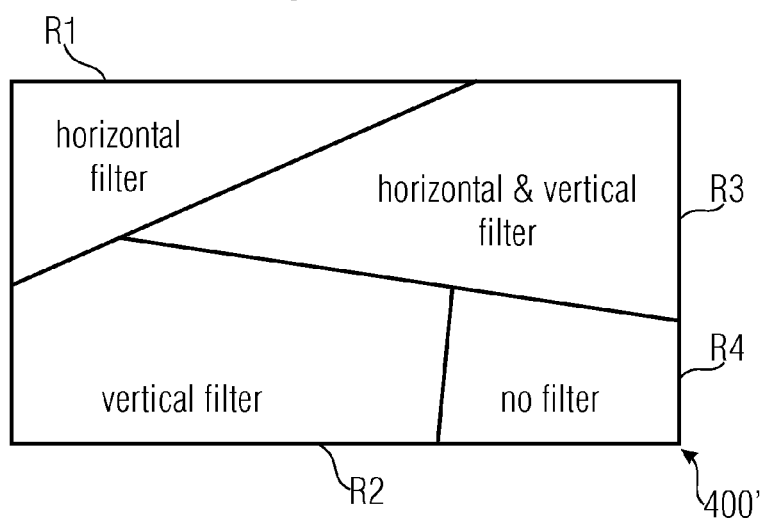
FIG. 4C is an exemplary subdivision of a reconstructed picture and the application of one-dimensional filters.

FIG. 4C shows another reconstructed picture 400', which has been subdivided into regions. As can be seen from FIG. 4C, to region R1 a horizontal one-dimensional filter is applied, to region R2 a vertical one-dimensional filter is applied, to region R3 both the horizontal and the vertical one-dimensional filters are applied, and to region R4 no filter is applied. Thus, FIG. 4C shows an embodiment, wherein the third region R3 can be regarded as the overlap region of the two larger regions R1 combined with R3 and R2 combined with R3, wherein first the horizontal filter is applied to the larger region R1 combined with R3 and afterwards the vertical filter is applied to the larger region R2 combined with R3. As explained previously, the application of one-dimensional filters not only allows to reduce the complexity of the filtering and the determination of the filter coefficients, but also to perfectly adapt to the first and second filters two regions of the reconstructed picture, which have for example a predominantly one-dimensional characteristic, see e.g. region R1 and region R2, and to also two-dimensional filter regions with two-dimensional characteristics, see e.g. region R3, by applying both one-dimensional filters in a cascaded manner. Similarly the application of a two-dimensional filter to specific regions of the picture also allows to reduce the complexity of the filtering because only the specific region is filtered (not the whole picture) and also allows to adapt the two-dimensional filters to the specific, e.g. one-dimensional and in particular two-dimensional characteristics of the specific region. Also two-dimensional filters can be applied in a cascaded manner to adapt to specific characteristics of a certain region.

In the following, embodiments of encoders and decoders using a quadtree for specifying the first region or second region or, in general, the region of the picture or reconstructed picture, will be described. Using the quadtree partitioning as described in the following, the picture or reconstructed version of the picture is divided into a number of partitions, for example blocks, of possibly different sizes for the purpose of assigning the partition or block to the region (e.g. to the first region or the second region). Using the quadtree partitioning, the granularity of the assignment of partitions of the picture or reconstructed picture (in general, for an easier understanding, it is only referred to "pictures" although the method applies to the picture as well as the reconstructed version of the picture or any filtered version of the reconstructed version of the picture). The partitions are associated to a specific region or, in other words, the indication whether a certain partition or block is assigned or associated with the region or not (in case of individual quadtree structures for each region). As explained previously, the picture is available as one or more planes of image sample values. In case of the YCbCr color space, the first plane typically represents the luma plane or luma channel, while the other two arrays represent the chroma planes or chroma channels. These planes may have differing dimensions as previously explained. A picture or, to be more precise, a plane of the picture, is divided into a number of square blocks of equal size, so-called "treeblocks". The edge length of the treeblocks is typically a power of 2, for example, 16, 32, 64, etc. when quadtrees are used. The use of other tree types is possible, including binary trees or trees with any number of leaves. Moreover, the number of children of the tree may be varied depending on the level of the tree and depending on what signal the tree represents.

For simplicity, we continue the description with quadtrees, i.e. trees that have exactly four children at each internal node. Each picture or plane of the picture is partitioned into root tree blocks or root tree partitions of a given size, e.g. a maximum partition size. Each of the root tree blocks constitutes a root quadtree together with subordinate quadtrees at each of the leaves of the quadtree. The root node of the quadtree corresponds to the full treeblock. Along the quadtree structure, each node can be further divided into four child nodes, which, in the case of the quadtree, means that each treeblock can be split into four sub-blocks with half the width and half the height of the treeblock. In the same manner, each of these sub-blocks can be further divided into four smaller sub-blocks with half the width and half the height of the original sub-block.

Figure 5C:
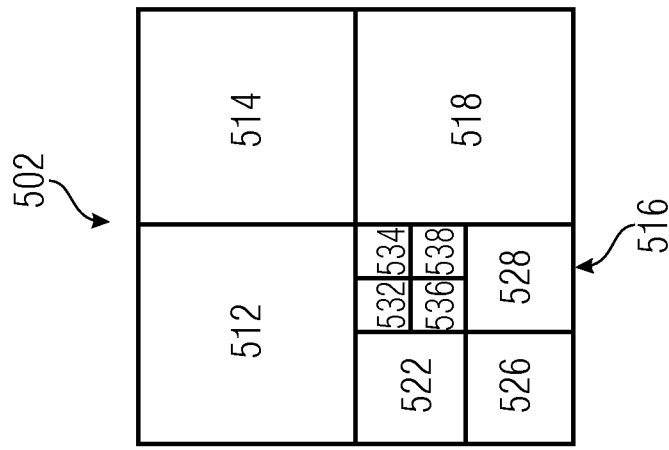
FIGS. 5A to 5D are an exemplary quadtree partitioning of a root treeblock of a reconstructed picture.
Figure 5B:
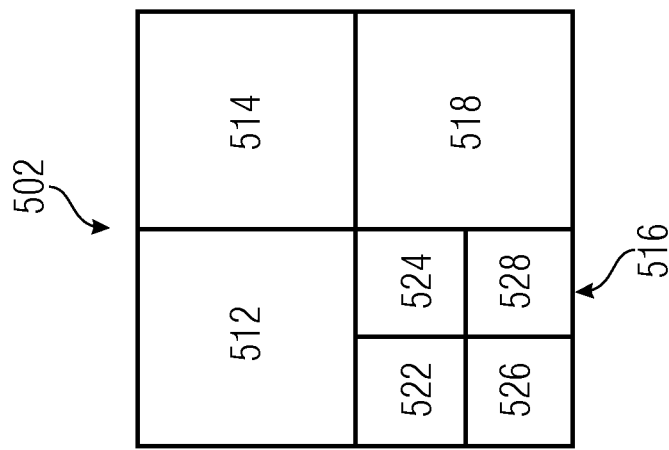
Figure 5A:
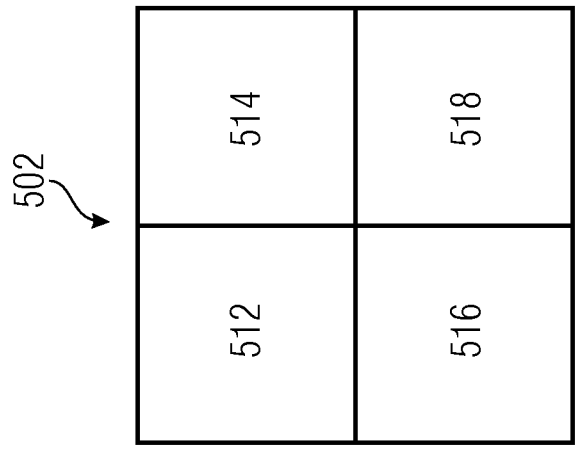

The partitioning of such tree root partitions or root tree blocks 502 with the maximum partitioning size will now be exemplarily described based on FIGS. 5A to 5D. FIG. 5A shows a root treeblock 502 that is first partitioned into four sub-blocks 512, 514, 516 and 518 of equal size. Afterwards, the third sub-block 516 is further partitioned into four sub-blocks 522, 524, 526 and 528 of equal size (see FIG. 5B). Finally, the second sub-block 524 of the third sub-block 516 is further partitioned into four sub-blocks 532, 534, 536 and 538 of equal size. As can be seen from FIGS. 5A to 5C, the sub-blocks 512 to 518 have half the width and half the height of the root treeblock 502, the sub-blocks 522 to 528 representing a further partitioning of the third sub-block 516 again have one half of the width and one half of the height of the third sub-block 516 and the sub-blocks 532 to 538 representing further partitioning of the second sub-block 524 of the third sub-block 516 with again one half of the width and one half of the height of the sub-block 524.

Figure 5D:
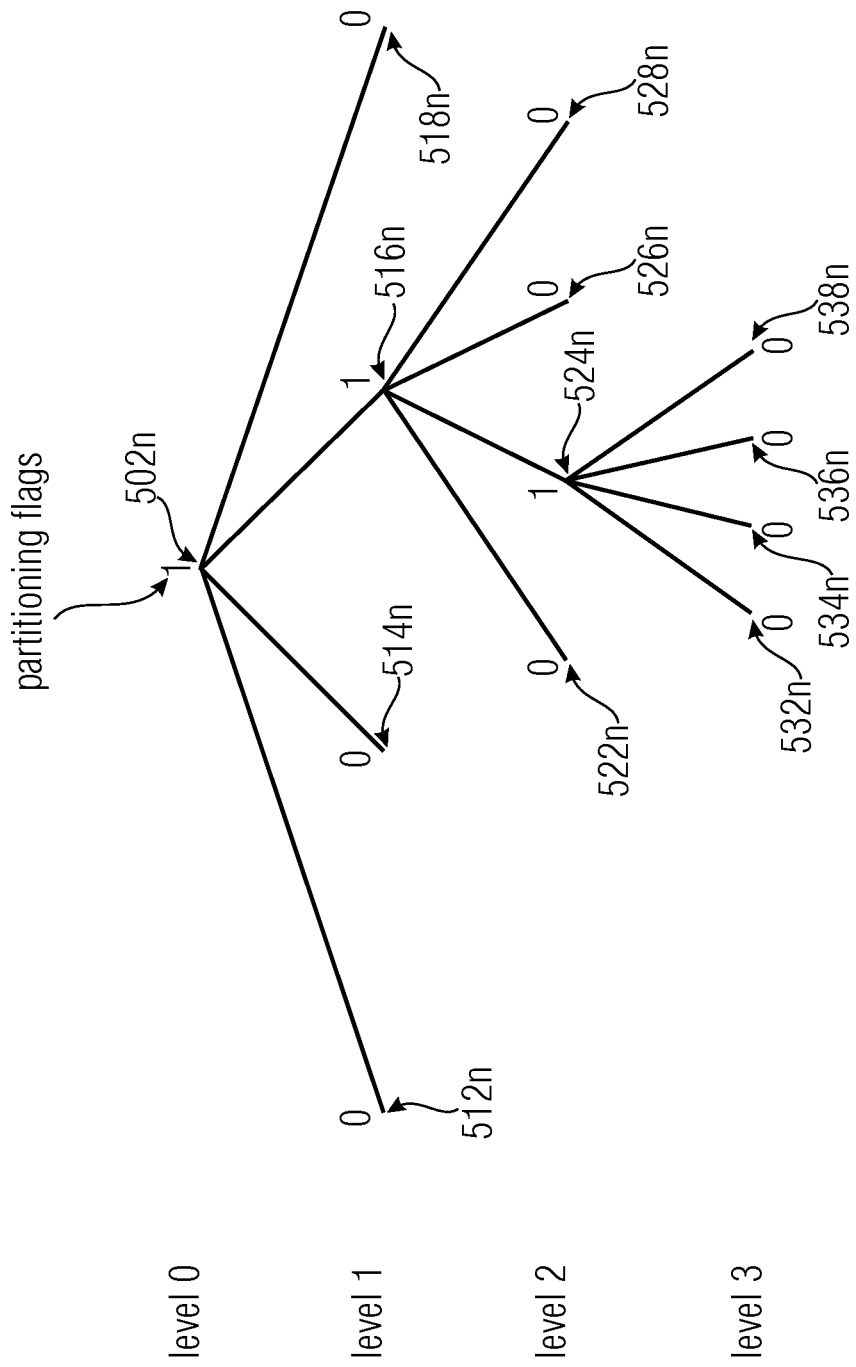

FIG. 5D shows the underlying tree structure (quadtree structure) for the exemplary quadtree-based partitioning as shown in FIGS. 5A to 5C. The numbers beside the tree nodes are the values of the so-called partitioning flags or subdivision flags, which will be explained in more detail later. The root node 502n of the quadtree is depicted on top of the Figure and is labeled "level 0" (root level). The root node 502n corresponds to the root tree block 502 in FIGS. 5A to 5C. The four branches at level 1 of this root node correspond to the four first level sub-blocks 512 to 518 as shown in FIG. 5A, wherein node 512n corresponds to the first sub-block 512, node 514n corresponds to the second sub-block 514, the third node 516n corresponds to the third sub-block 516 and node 518n corresponds to the fourth sub-node 518 of FIG. 5A. As the third node 516n is further sub-divided into four sub-blocks (as shown in FIG. 5B), the third node 516n at level 1 in FIG. 5D also has four branches with nodes 522n to 528n, wherein node 522 of level 2 corresponds to the first sub-block 522 of FIG. 5B, node 524n to the second sub-block 524, node 526n to the third sub-block 526 and the fourth node 528n to the fourth sub-block 528 of sub-block 516 as shown in FIG. 5B. Again, corresponding to the further partitioning of the child node 524 as shown in FIG. 5C, there are four further sub-branches connected with the second node 524 at level 2 of the quadtree hierarchy. Once more, the first node 532n of level 3 corresponds to the first sub-block 532, the second node 530n of level 3 corresponds to the second sub-block 534, the third node 536n corresponds to the third sub-block 536 and the fourth node 538n of level 3 corresponds to the fourth sub-block 538 (of level 3) as shown in FIG. 5C. The nodes at level 3 are not sub-partitioned or partitioned any further. Each leaf or leaf node of the quadtree as shown in FIG. 5D corresponds to a variable-sized block with a corresponding variable granularity for which individual assignments to one or more filters can be specified or, for which individually it can be indicated whether the sub-block or node is assigned to a specific region or not.

In certain embodiments, the encoder (data stream mapper or inserter) can be adapted to transmit the structure of the quadtree and the corresponding partitioning of the picture plane into variable-size blocks for assigning a region to the variable-size blocks in the data stream. The minimum and maximum admissible block sizes can also be transmitted as side information and may change from picture to picture. These minimum and maximum block sizes can be different for the different planes, for example, different for the luma plane and one or all of the chroma planes. For the signaling of the quadtree structure, the quadtree is traversed and for each node, it is specified whether this particular node is a leaf node of the quadtree, i.e. the corresponding part is not sub-divided any further or if it is further partitioned or branched into four further child nodes, i.e. the corresponding block is divided into four sub-blocks with half the size.

The signaling within one picture or picture plane can be done treeblock by treeblock (root treeblock by root treeblock) in a raster scan order, for example, from left to right and top to bottom, wherein each treeblock (root treeblock and its respective tree structure) is traversed in depth-first order for signaling the sub-division information.

Although embodiments of the signaling of the quadtree structures are described herein, wherein the structure and information is signaled tree-by-treeblock in a raster scan order (from left to right and top to bottom), other embodiments can use any other raster scan orders, for example, bottom right to top left and any other "scan order", for example, checker board scanning, etc.

Figure 5E:
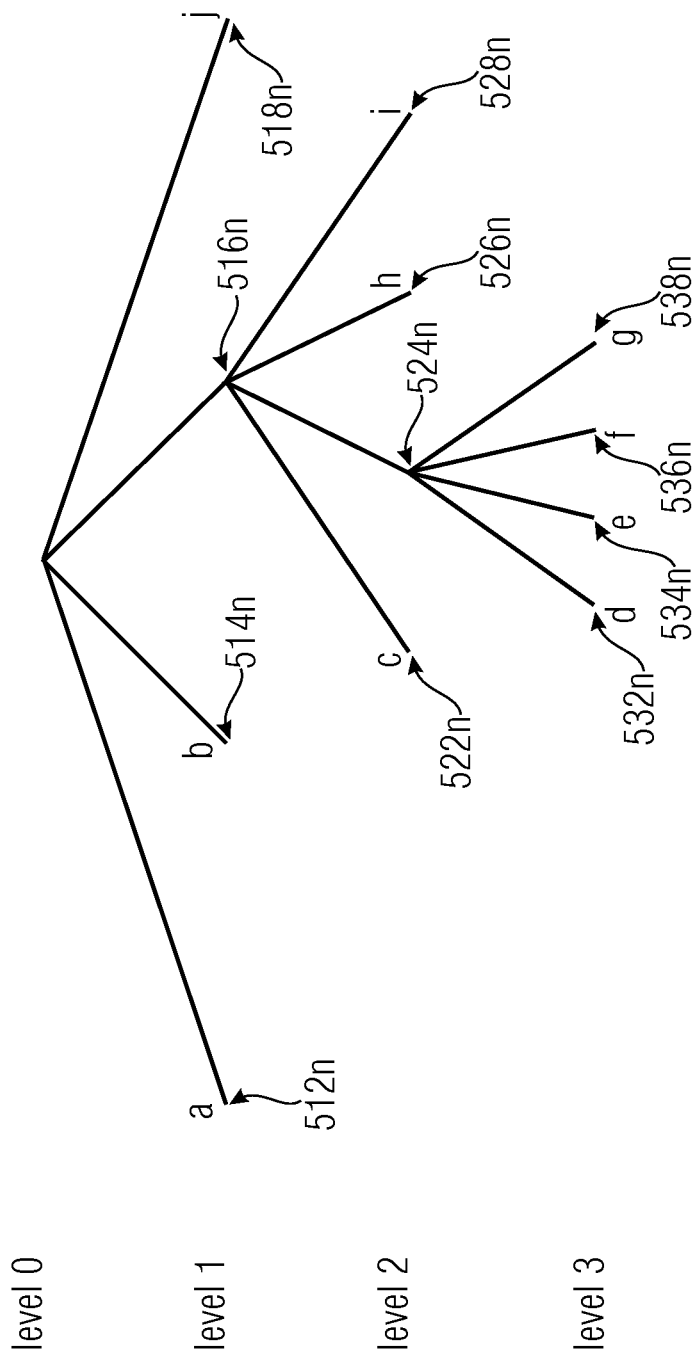
FIGS. 5E and 5F are the corresponding leaf node order of the quadtree partitioning of FIGS. 5A to 5D in case of a depth-first traversal.

FIG. 5E shows an example of a tree structure of FIG. 5D according to the depth-first order traversal according to an in-treeblock scan order from left to right and top to bottom wherein a sub-block 512 of level 1 is the first sub-block to be traversed according to the scan order. The first sub-block 512 is not further partitioned, therefore, the corresponding node 512n of level 1 is a leaf node denoted "a" in FIG. 5A. The second block (top-right block) 514 of FIG. 5A is the next block according to the raster scan order to be traversed. This second sub-block of level 1 is also not further partitioned and, therefore, constitutes a leaf node denoted "b". The left bottom sub-block 516 is the third sub-block according to the raster scan order. The third sub-block 516 is further divided as shown in FIG. 5B. Therefore, as the treeblocks are traversed in depth-first order, the traversing now continues with the next higher level, i.e. the second level (level 2), and the corresponding sub-blocks 522 to 528 and potential further sub-partitions into sub-blocks of levels 3 and 4, etc. before continuing with the fourth sub-block 518 of the first level (level 1). Continuing the depth-first traversal for the second level (level 2) and the third level (level 3), the top left sub-block 522 of level 2 becomes the third leaf node "c", the first sub-block 532 of level 3 (as shown in FIG. 5C) becomes the fourth leaf node "d", the second sub-block 534 of level 3 becomes the fifth leaf node "e", the third sub-block or left-bottom sub-block 536 of level 3 becomes the sixth leaf node "f", the fourth or bottom-right sub-block 538 of level 3 becomes the seventh leaf node "g", the third or bottom-left sub-node 526 of the second level becomes the eighth leaf node "h", the fourth and bottom-right sub-block 528 becomes the ninth leaf node "i" and the fourth or bottom-right sub-block 518 of level 1 becomes the tenth leaf node "j". Therefore, the quadtree structure can be presented with the leaf nodes labeled as a, b, . . . , j according to the predefined raster scan order and is completely and unambiguously defined by that sequence.

In alternative embodiments, wherein the treeblocks and leaf nodes are traversed in breadth-first order, the tree structure is traversed level-by-level and the following order would be obtained by traversing the tree as shown in FIG. 5E "a, b, j, c, h, i, d, e, f, g". Again, the tree structure would be completely and unambiguously specified between the encoder and the decoder in case the decoder knows the raster scan order and the traversal order (depth-first order or breadth-first order, or whatever order) for the root tree blocks and the maximum partitioning size of the root treeblocks and the scan order for partitioning the picture or the plane of the picture into the root treeblocks or partitions.

Figure 5F:
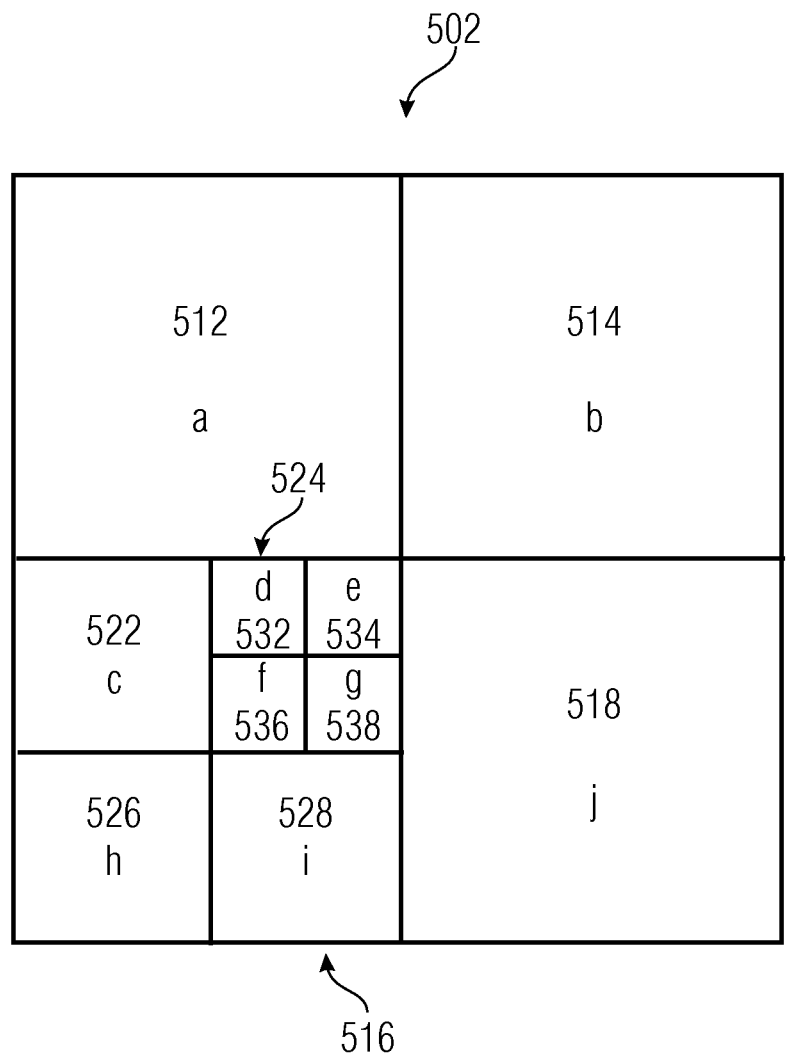

FIG. 5F shows the Quadtree structure partitioning of the root treeblock 502 into the sub-blocks of the different levels and the associated leaf nodes and the leaf node order or quad block order resulting from the depth-first traversal.

The signaling for each treeblock is done recursively along the quadtree structure of the root quadtree, such that for each node, a flag is transmitted specifying whether the corresponding block is split into four sub-blocks or not. If this partitioning flag or subdivision flag has a first value, for example, value "1" (for "true"), then this signaling process is repeated recursively for all four child nodes, i.e. all sub-blocks in raster scan order (for example, top left, top right, bottom left, bottom right) until the leaf node of the quadtree is reached. On the other hand, a leaf node is characterized by having a partitioning flag or sub-division flag with a second value being different from the first value, for example, the value "0" (for "false"). For the case that a node resides on the lowest hierarchy level of the primary quadtree and, thus, corresponds to the smallest admissible block-size, no sub-division flag needs to be transmitted. This would be redundant information. For the example shown in FIGS. 5A to 5C, first a "1" would be transmitted specifying that the root treeblock is split into its four sub-blocks 512 to 518 as shown in FIG. 5A. Then, the sub-division information of all the four sub-blocks 512 to 518 would be recursively encoded in raster scan order. For the first two sub-blocks 512 and 514, a "0" specifying that they are not sub-divided is transmitted. For the third sub-block 516, a "1" would be transmitted specifying that this block is further sub-divided or partitioned. According to the recursive approach, the four sub-blocks 522 to 528 of this block 516 are processed. Here, a "0" would be transmitted for the first sub-block 522, a "1" would be transmitted for the second sub-block 524. Again, according to the recursive approach, now the four sub-blocks 532 to 538 of the smallest block-size are processed. In case the smallest block-size is reached, no more data would have to be transmitted for indicating whether these sub-blocks are further partitioned, since further partitioning is not possible. Otherwise, in case the smallest block-size is not reached, a "0000" specifying that none of these blocks 532 to 538 is further partitioned, is transmitted. After this, a "00" for the lower two blocks 526 an 528 and, finally, a "0" for the bottom right block 518 of level 1 is transmitted. So, the complete binary string representing the quadtree structure is:
100101 (0000) 000
with the brackets indicating that these four "0"'s are not transmitted in case the level 3 is already the highest level or resolution level. Below for illustrative purposes only the same string is shown with subscripts for each flag indicating the level of the sub-block:
$1_0 0_1 0_1 1_1 0_2 1_2 (0_3 0_3 0_3 0_3)\ 0_2 0_2 0_1$.

For the alternative embodiment using a breadth-first traversal, the partitioning information would be transmitted in a different order (again showing the level subscripts only for illustrative purposes):
$1_0 0_1 0_1 1_1 0_1 0_2 1_2 0_2 0_2\ (0_3 0_3 0_3 0_3)$.

The input signal to be encoded, for example, one picture of a video sequence or a still picture is typically given in the form of one or more sample arrays or sample planes as explained previously. In the context of the coding of a picture of a video sequence or a still picture, these sample arrays or planes might refer to the three color planes (RGB) or to luma and chroma planes (YUV/YCbCr). Additionally, planes representing a (transparency) and/or depth information for 3-D video material might be present. The number of these arrays or planes is grouped together as a so-called plane group. For example, luma (Y) might be one plane group with only one array or plane and chroma (CbCr) might be another plane group with two arrays of planes or, in another example, YUV might be one plane group with three arrays or planes and the depth information for 3-D video material might be a different plane group with only one array or plane.

For every plane group, one quadtree structure representing the division into blocks assigned to one or several regions can be used.

In the following, embodiments of the encoder adapted to improve the image quality of the reconstructed image based on the rate-distortion optimization are described.

Figure 6:
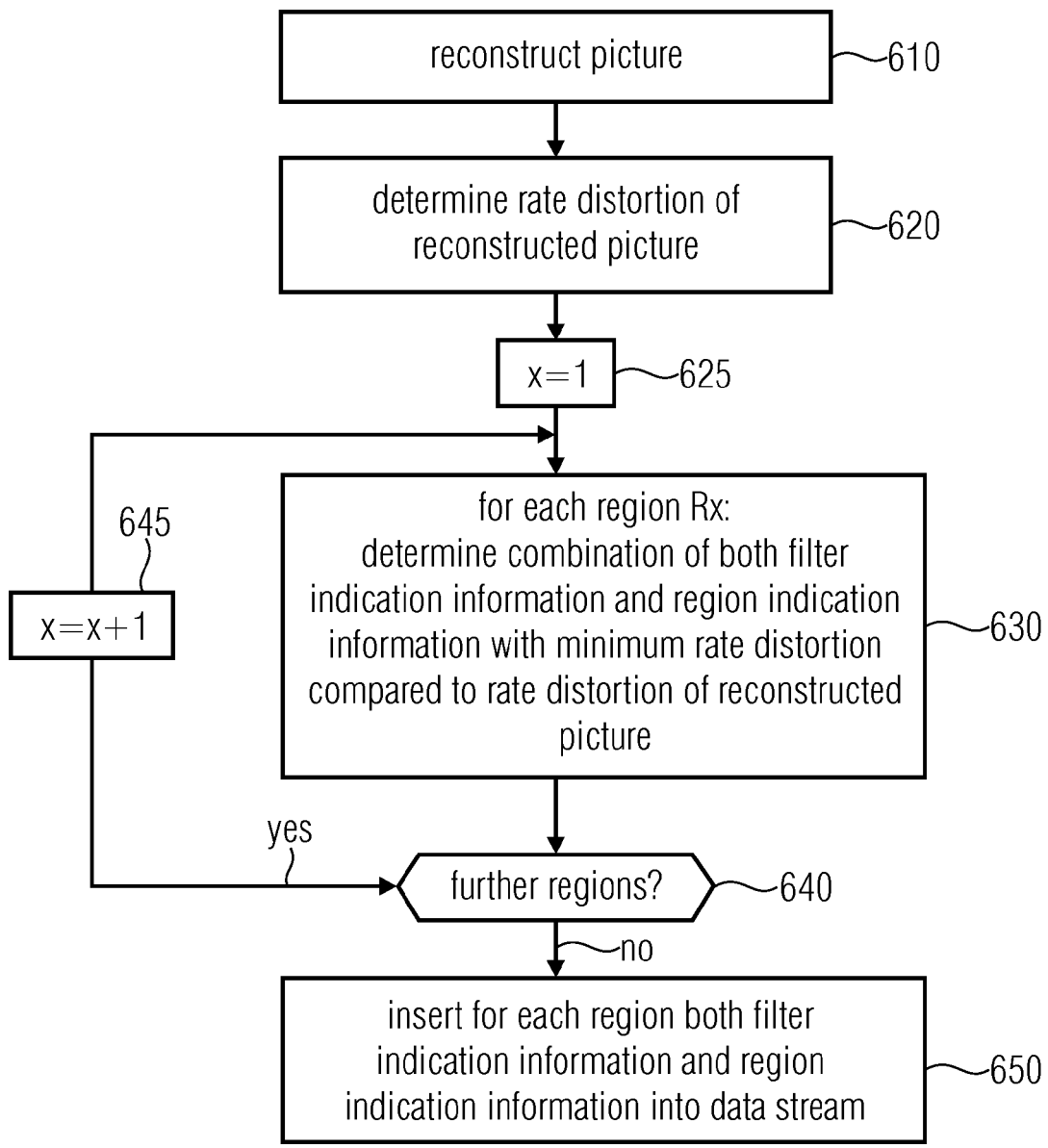
FIG. 6 is a flow chart of an embodiment of a method for determining the filters and associated regions of an adaptive filter stage.

FIG. 6 shows a flow chart of an embodiment of a method for determining the two distinct regions R1, R2 and the respective filter functions F1, F2 using the rate-distortion as optimization metric. In step 610, the picture is reconstructed, e.g. by the prediction loop 190 or the pre-encoder 180. In step 620, the rate distortion of the reconstructed picture is determined by comparing the reconstructed picture with the original picture 102, for example, by calculating the mean squared error between the corresponding samples representing the original picture and the samples representing the reconstructed version of the picture. The rate distortion of the reconstructed picture will be used to determine whether the application of a filter to a specific region improves the coding efficiency, wherein the coding efficiency is improved in case the application of a filter to a specific region improves the rate-distortion function of the reconstructed picture. In case the application of a filter to a specific region does not improve the rate distortion compared to the reconstructed picture, this region will not be filtered with the corresponding filter. In step 625, the region index x is set to 1 (initialization for first region R1). In step 630, the combination of both the filter indication information specifying the filter F1 applied to the first region R1 and the region indication information specifying the first region R1 or, in other words, specifying the assignment of samples of the picture (or a specific plane of the picture) to the first region R1 with the minimum rate distortion, is determined. In step 640, it is checked whether further combinations of regions (region indication information) and corresponding filters (filter indication information) are to be determined. As only the first region and the corresponding first filter has been determined, the region index x is increased (see step 645) and step 630 is repeated for the second region R2 (x=2) and the second filter F2 associated to the second region R2 is determined. In other words, step 630 is performed for each region R1, R2, R3, etc.

The decision whether to determine further regions and the corresponding filters in step 640 can, for example, be taken based on comparing the region index x with a maximum index and to terminate the determination of further regions and corresponding filters in case the maximum number of regions has been reached. In addition to this decision criterion or instead of this decision criterion, the additional rate-distortion gain (i.e. rate distortion reduction) achieved by the last or actual combination of region Rx and filter Fx can be compared with a threshold value, wherein a further combination of a region Rx+1 and an associated filter Fx+1 is only determined in case the rate-distortion gain is above a predetermined rate distortion gain threshold. Otherwise, the loop 630, 640, 645 is terminated and, as indicated in step 650, both the filter indication information (specifying the filter Fx) and the region indication information (specifying the region Rx) is inserted for each region into the data stream.

Referring back to FIG. 1 and the encoder 100, the reconstruction loop 180 can be adapted to reconstruct the picture (step 610). Step 620 (determination of rate distortion of the reconstructed picture) can be performed, for example, by the predictor 140 or the in-loop filter stage 170. Steps 625, 630, 640 and 645 are performed by the in-loop filter stage 170 or the out-of-loop filter stage. After the combinations or pairs of filter indication information and region indication information have been determined by the filter stage 170, the respective information is passed to the data stream inserter 150, which is adapted to insert the filter indication information and the corresponding region indication information for each of the combinations as a second sub-set of syntax elements into the data stream 152.

Figure 7A:
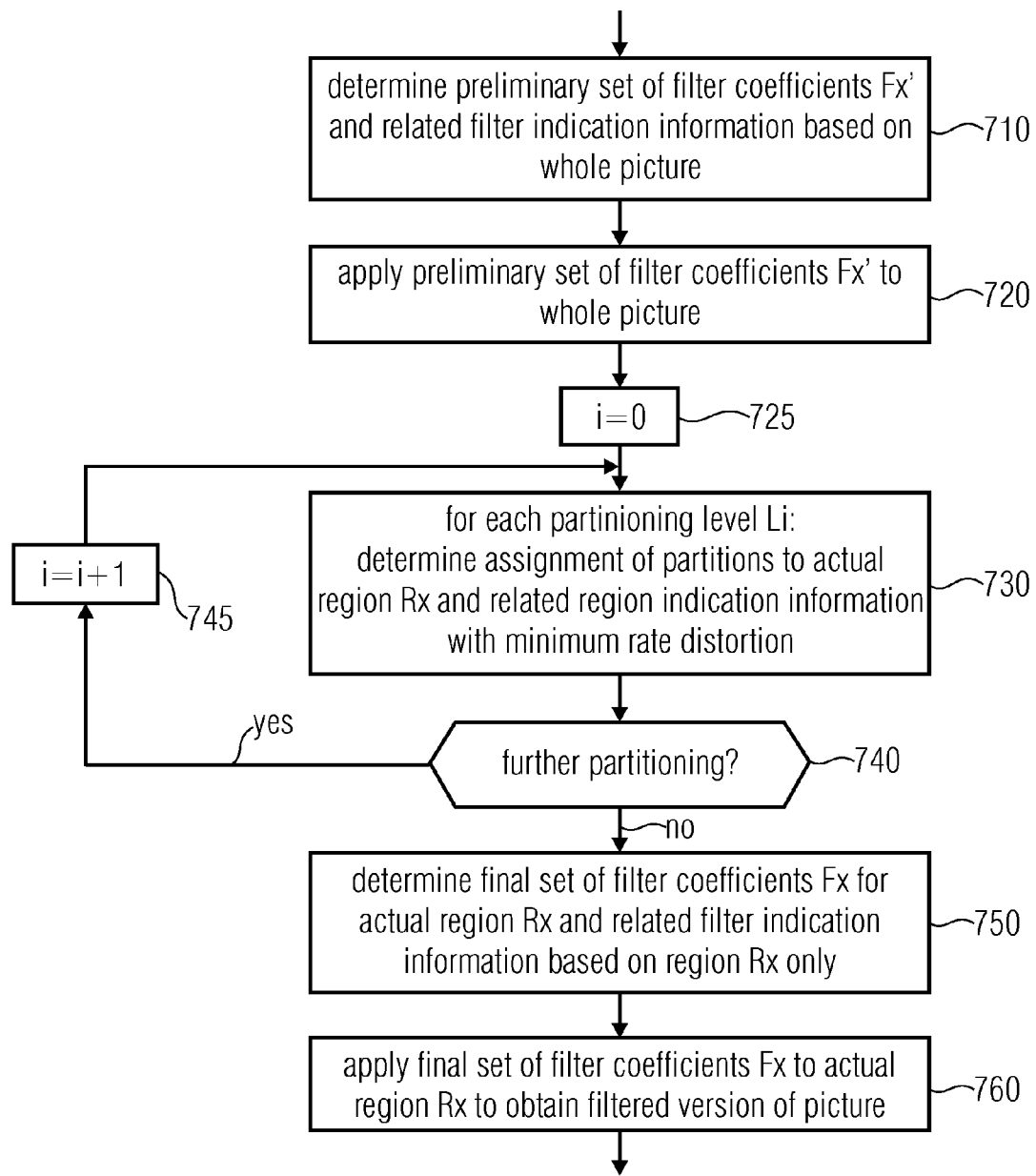
FIGS. 7A and 7B are flow charts of step 630 of the flow chart of FIG. 6.
Figure 7B:
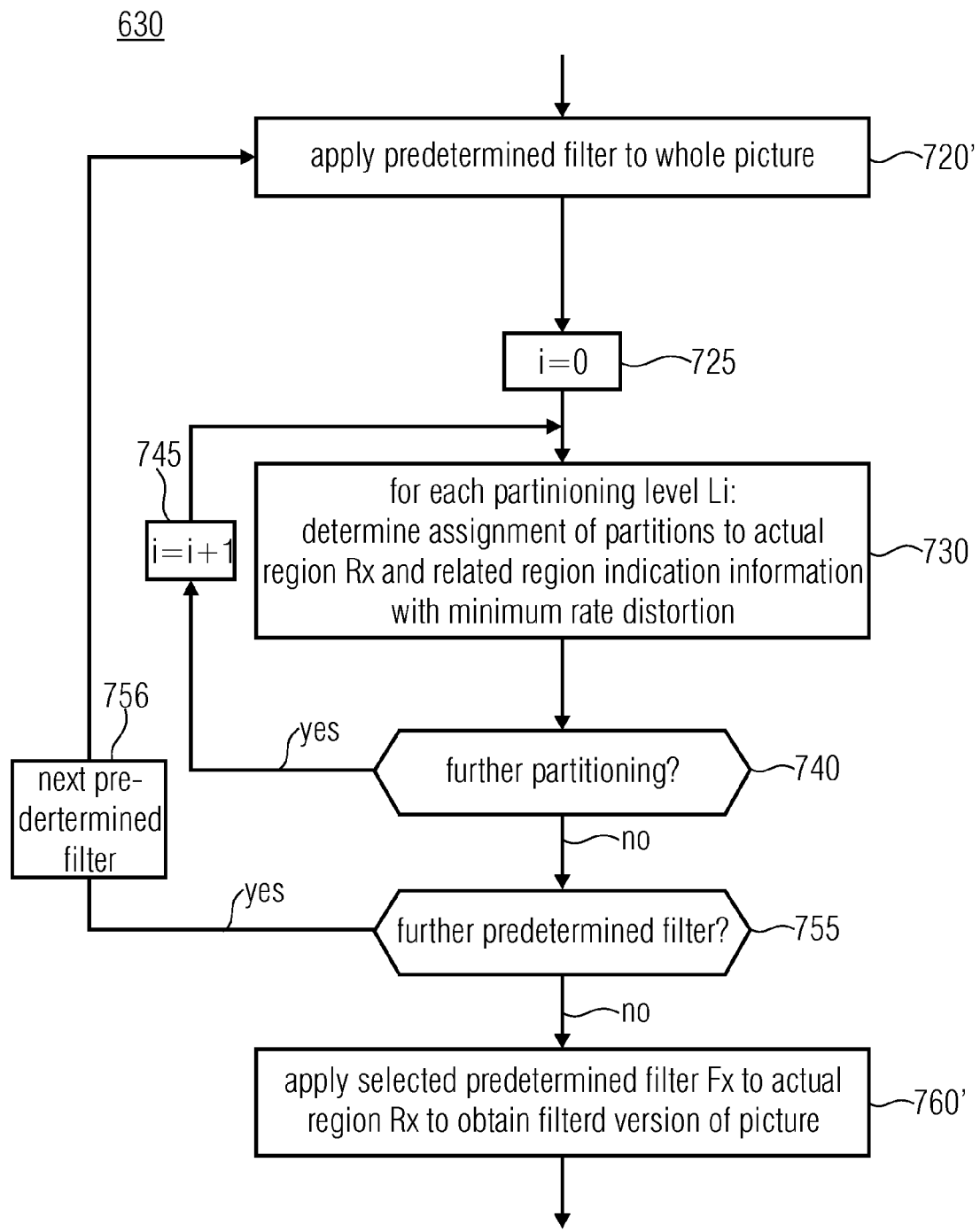

FIGS. 7A and 7B show flow charts of two embodiments for step 630 of FIG. 6.

FIG. 7A shows an embodiment of step 630 of an adaptive filter scheme or adaptive filter stage determining the filter coefficients by minimizing the mean square error between the reconstructed picture samples and the original picture samples. In step 710, a preliminary filter Fx' or a preliminary set of filter coefficients Fx' and the related filter indication information is determined based, for example, on the whole reconstructed picture. In step 720, the preliminary set of filter coefficients Fx' is applied to the reconstructed picture to obtain a preliminary first filtered version of the reconstructed picture. In step 725, the partitioning level index or granularity index i is set to 0 (initialization for root level i=0) and in step 730, the first filtered version of the reconstructed picture is partitioned into root partitions as described previously based on FIGS. 5A to 5D (root level 0 with i=0) and the optimum preliminary assignment of the root partitions (502 in FIG. 5A to FIG. 5C) to the region Rx to be filtered and the related region indication information, i.e. the level 0 partitioning and region flags (partitioning flag and region flag will be discussed in more detail based on FIGS. 10A to 10C) are determined, i.e. a preliminary assignment of partitions to the actual region Rx to be determined and the related region indication information with the minimum rate distortion is determined. Step 730 is performed by comparing the original picture samples with the corresponding samples of the preliminary preliminary first filtered version of the reconstructed picture, for example, by calculating the mean square error between the two representations. In step 740, it is determined whether the picture is to be further partitioned, e.g. is to be partitioned into the next smaller partitions constituting the next higher granularity level (higher resolution). In case a further partitioning is to be performed, the layer index i (see step 745) is incremented and step 730 repeated for the next partitioning level. Step 730 is performed for each of the partitioning levels or granularity levels, for example, for three further partitioning or granularity levels, level 1 (L1) to level 3 (L3) as described based on FIGS. 5A to 5D. Thus, according to the method shown in FIG. 7A, for each granularity level Li, the assignment of partitions of the respective levels to the specific region Rx (for example, the first region R1 or the second region R2) and the related region indication information with the minimum rate distortion is determined. In step 740 from these different region assignments or region indication information, each representing potentially a different candidate of the region Rx with a potentially different granularity level Li, the candidate with the minimum rate distortion is chosen according to the overall rate-distortion optimization criterion.

In case no further partitioning is to be performed (step 740), in step 750—based on the final region Rx determined in step 740—the final set of filter coefficients Fx for the region Rx and the related filter indication information is determined based on reducing the mean square error between the original picture and the reconstructed version of the picture (in case of the first region R1) or a filtered reconstructed version of the picture (in case of region R2 or any other further region). Thus, the optimization of the set of filter coefficients Fx is further improved as the influences of the samples of the remaining or rest region of the reconstructed picture, which are not assigned to the first region and which can be said to form a first remaining region of the picture have no impact. The remaining region forms the complementary part to region Rx, wherein Rx and the complementary remaining region Rxr cover the whole picture. The remaining region associated to the actual region Rx will noted as Rxr, e.g. R1r for R1.

In step 760, the final first set of filter coefficients F1, or short, the first set of filter coefficients F1, is applied locally to the reconstructed picture, i.e. only to the first region R1 to obtain the (final) first filtered version of the reconstructed picture. The first filtered version of the reconstructed picture is used as the basis for the next iteration of FIG. 6, i.e. the next processing of step 630 for the second region. Also for the second region R2, a preliminary set of filter coefficients F2' and the respective preliminary filter indication information is determined (step 710), however, based on the first filtered version of the reconstructed picture (instead of the reconstructed picture itself as for region R1). Again, the assignment of partitions at various granularity levels and the related region indication information with the minimum rate distortion is obtained by performing steps 725 to 740 to determine the optimum second region R2 and the related region indication information (including the granularity level). Based on the second region R2, in step 750 the final second set of filter coefficients F2 and the related filter indication information is determined (again based on minimizing the mean square error for region R2 only). In step 760, again, the second set of filter coefficients F2 is applied to the second region R2 of the first filtered version of the reconstructed picture (selectively) to obtain a second filtered version of the reconstructed picture, which can, for example, be used for determining a third region with the corresponding third set of filter coefficients by performing another loop or step 630 according to FIG. 6 or in case no further iteration is performed, can be output to the predictor 140 of FIG. 1 to improve the inter-frame prediction.

The decision in step 740 whether to perform another iteration 745, 730 or not can be based on different criteria. One possibility is to perform step 730 for a predetermined number of partitioning or granularity levels or for predefined partitioning granularity levels and in case the number or predetermined granularity level index is reached, to proceed with step 750. Another possibility is to compare the further improvement or gain of the rate distortion at the actual granularity level Li compared to the preceding lower granularity levels, e.g. Li−1, and to stop the iteration in case the gain with regard to the rate distortion does not exceed a certain threshold, e.g. is below a certain rate-distortion gain threshold. Another possibility is to compare the actually achievable minimum rate distortion with a rate distortion threshold and to stop the iteration (i.e. continue with step 750) in case the rate distortion is below the rate distortion threshold. In another embodiment, the rate-distortion gain or reduction compared to the rate distortion of the reconstructed version of the picture is compared to a rate-distortion gain threshold and the iteration is terminated in case the rate-distortion gain exceeds the rate-distortion gain threshold.

In FIG. 7A the filter coefficients (the preliminary and the final filter coefficients) are, for example, determined based on minimizing the mean square error between the samples of the original picture and the corresponding samples of the reconstructed version of the picture (for the first filter F1) or the corresponding samples of a filtered version of the reconstructed version of the picture (e.g. for the second filter F2 and any further filters Fx), for example, by calculating the auto-correlation of the samples of reconstructed or filtered reconstructed version of the picture and the cross-correlation of the samples of the reconstructed or filtered reconstructed version of the picture and the original picture. The filter can be, for example, an adaptive Wiener filter and the filter coefficients can be determined using or not using filter constraints with regard to the filter dimensions and/or the filter symmetry.

FIG. 7B shows an alternative embodiment of an adaptive filtering or adaptive filter stage 170. According to the embodiment shown in FIG. 7B, a plurality of predetermined filters or sets of filter coefficients is available at the encoder and the decoder, and the adaptation of each of the filters (F1, F2, etc.) is performed by selecting the optimum combination of a predetermined filter and assignment of samples to the corresponding region to be filtered by this filter. Again, the combination with the minimum rate distortion is selected. Therefore, for each predetermined set of filter coefficients, steps 725, 730, 740 and 745 as described based on FIG. 7A are performed. In other words, for each predetermined set of filter coefficients and for each partitioning o granularity level Li (see step 730), the assignment of partitions to the actual region Rx and the related region indication information with the minimum rate distortion is determined and once the optimum region indication information with the minimum rate distortion across the different partitioning or granularity levels is found (step 740), a decision depending on the determination criteria as explained for step 740 in FIG. 7A, the region indication information (including the respective granularity level) is stored for the actual predetermined set of filter coefficients. The same procedure is performed for each of all or a selected number of other predetermined sets of filter coefficients. In step 755 it is decided, whether to repeat steps 725 to 744 for another predetermined set of filter coefficients. The decision can be based on similar decision criteria as explained for step 740.

The decision in step 755 whether to perform another iteration 756, 710, 725, 730, 740 and 745 or not can be based on different criteria. One possibility is to perform the iteration for a predetermined number of predetermined filters and in case the number is reached, to proceed with step 760. Another possibility is to compare the actually achievable minimum rate distortion with a rate distortion threshold and to stop the iteration (i.e. continue with step 760) in case the rate distortion is below the rate distortion threshold. In another embodiment, the rate-distortion gain or reduction compared to the rate distortion of the reconstructed version of the picture is compared to a rate-distortion gain threshold and the iteration is terminated in case the rate-distortion gain exceeds the rate-distortion gain threshold.

In case the decision criterion for terminating the iteration is not met, the next predetermined set of filter coefficients is processed. In case the decision criterion is fulfilled, the predetermined set of filter coefficients with the minimum rate distortion (obtained under consideration of the additional information needed for the region indication information and the filter indication information) is selected as the region indication information and the filter indication information for the actual region and filter (for example, the first region and the corresponding first filter coefficient set F1). As in FIG. 7A, the selected set of predetermined filter coefficients is applied selectively or locally to the first region specified by the region indication information to obtain the first filtered version of the reconstructed picture.

As explained based on FIG. 7A, an additional iteration, i.e. another processing of step 630 for a second or further regions can be performed to select a second predetermined set of filter coefficients to be applied to the second region based on the minimum rate-distortion criterion of the first filtered version of the reconstructed picture.

Figure 10A:
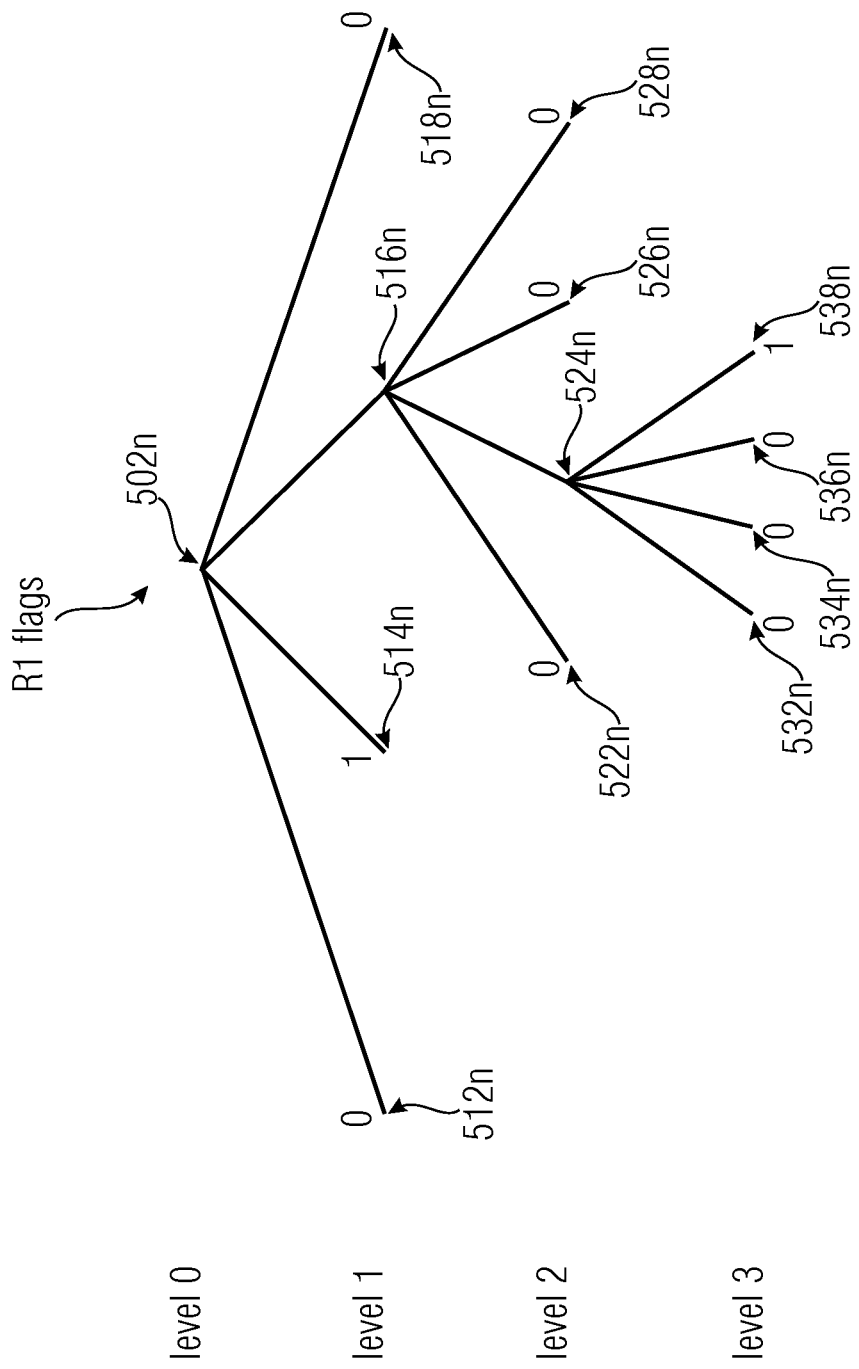
FIGS. 10A to 10C are embodiments of quadtrees according to FIGS. 8A to 9C.
Figure 10B:
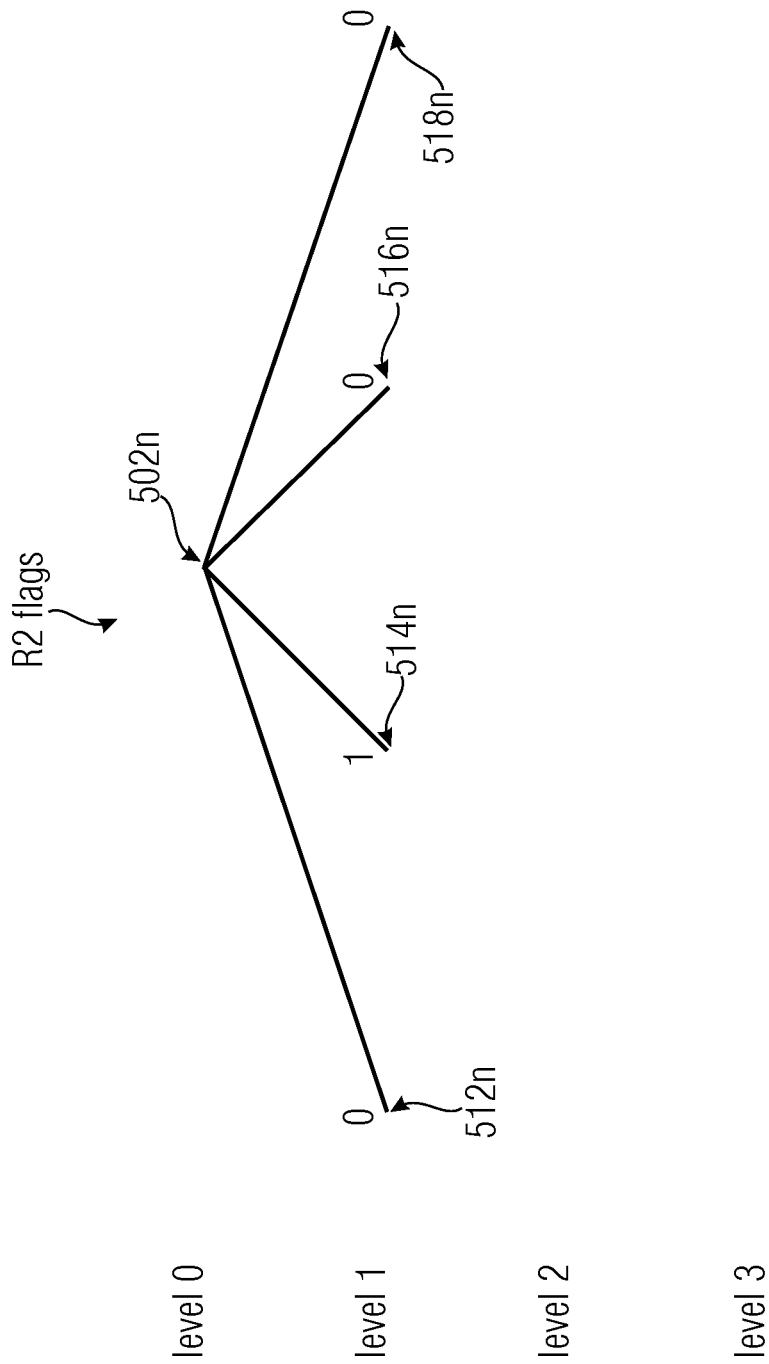

In the following, the determination of the quadtree structure for the first region and the second region will be described based on FIG. 8A to 8C (first region R1) and FIGS. 9A to 9C (second region R2) and the corresponding quadtree representation possibilities will be described based on FIGS. 10A to 10C.

FIG. 8A shows an exemplary root treeblock 502 with the four partitions 512 to 518 as described based on FIG. 5A. The dot-hashed line 802 indicates the optimum border line between the first region R1 and the complementary or remaining region R1r in case only the minimization of the distortion between the reconstructed picture and the original picture is used as optimization criterion (conventional approach). As can be seen from FIG. 8A, the root treeblock 502 is partitioned into its four partitions 512 to 518, which corresponds to the partitioning at the first resolution or granularity level L1. Based on the minimum rate-distortion criterion, only partitions 514 and 518 are assigned to region R1, whereas the partitions 512 and 516 are not assigned to region R1. the latter two are, in other words, thus, implicitly assigned to the remaining region R1r.

FIG. 8B shows the partitioning of the root treeblock 502 at the second granularity level L2, wherein partitions 514, 518 of the first granularity level and partition 528 of the second granularity level (being a partition of the third partition 516 of the first granularity level) are assigned to region R1, whereas the first partition 512 of the first granularity level and the first, second and third second-level partitioning 522, 524, 526 form the remaining region R1r.

In FIG. 8C, the partitioning of the root treeblock 502 at the third granularity level L3 is shown. As can be seen from FIG. 8C, the second and fourth partitions 514, 518 of the first granularity level, the fourth partition 528 of the second granularity level and the fourth partition 538 of the third granularity level are assigned to the first region R1, whereas the first partition 512 of the first level, the first and third partitions 522, 526 of the second granularity level and the first, second and third partition 532, 534 and 536 of the third granularity level form the first remaining region R1r.

According to one embodiment of the invention, the encoder 100 or the filter stage 170 is adapted to compare the rate distortion associated with the region indication information needed for defining the first region R1 according to FIG. 8A (only the first granularity level), according to FIG. 8B (first and second granularity levels) and according to FIG. 8C (first to third granularity levels) with each other end to select the candidate of the first region R1 of the three candidates shown in FIGS. 8A to 8C with the minimum rate distortion (under consideration of the additional amount of the information to be signaled to define the first region R1, i.e. the amount of information or number of bits of the region indication information). The region indication information comprises, for example, the partitioning flag tree structure as shown in FIG. 5D defining whether a node or a partition is further partitioned and a first region flag tree structure indicating at the leaf nodes of the tree structure whether the node or partition is assigned to the first region or not. A first value, for example, "1" indicates that a node or partition is assigned to the first region and a second value, for example, "0" indicates that the specific node or partition is not assigned to the first region and, thus, is implicitly assigned to the first remaining region R1r. The corresponding first region flag tree for the third level partitioning according to FIG. 8C is shown in FIG. 10A. In case of a first level partitioning or resolution or granularity, as shown in FIG. 8A, the partitioning flag tree would only comprise two layers (level 0 and level 1) and only node 502n would comprise a "1", whereas the first level nodes 512n to 518n would all comprise a "0", because they are not further partitioned. Correspondingly, the first region flag tree would not comprise a value at the root level node 502n, comprise a "1" at first level nodes 514 and 518n and a "0" at the first level nodes 514n, 516n. The corresponding applies to FIG. 8B. In other words, the firsts region R1 (or any other region) can be completely defined by using the quadtree structure and the corresponding partitioning flag tree and the respective region flag tree as region indication information. The trees can be traversed as explained previously, for example, in depth-first or breadth-first order.

FIGS. 9A to 9C show an exemplary sub-division of the root treeblock of FIGS. 8A to 8C into a first region R1 and the second region R2, wherein the first region R1 and the second region R2 overlap. As shown in FIGS. 9A and 9C, the second region may also be a sub-region of the first region R1, i.e. completely comprised by the first region. The double-dot-hashed line 902 shows the borderline between the second region R2 and the second remaining region R2r for the conventional approach, i.e. the separation of the picture into the second region and the second remaining region R2r in case only the quality (not considering the cost of additional information to be signaled to define the second region R2) is performed. For simplicity it is assumed that borderline 902 corresponds to the border of the second first level partition 514.

FIG. 9A shows the partitioning of the root block 502 in case the filter stage selected the first level granularity partition of FIG. 8A as the optimum partitioning with regard to the rate-distortion criterion. In this case, as explained previously, the second and fourth first layers or first level partitions 514 and 518 are filtered with the first set of filter coefficients F1 and the second set of filter coefficients F2, if associated to the second region R2 are applied to the first filtered version of the reconstructed picture. In other words, the first and third first level partitions 512 and 516 remain unfiltered, the fourth first level partition 518 is only filtered by filter F1 and the second first level partition 514 is first filtered by the first filter F1 and afterwards filtered by the second filter F2.

FIG. 9B shows the sub-division of the reconstructed picture in case the second level granularity partitioning according to FIG. 8B is applied to the reconstructed version of the picture. FIG. 9C shows the sub-division of the reconstructed picture in case the third level partitioning according to FIG. 8C is applied to the reconstructed version of the picture. For the second level and the third level partitioning according to FIGS. 9B and 9C, the same considerations with regard to the selective non-filtering and filtering with filters F1 and F2 applies correspondingly (as explained based on FIG. 9A).

As can further be seen from FIGS. 9A to 9C, a further partitioning of the treeblock or the second first level block or partition 514 does not improve the quality. Therefore, for defining the second region R2, only a first level partitioning is needed and provides the minimum rate distortion. FIG. 10B shows an exemplarily second region flag tree comprising only the root level and the first level. According to the notation as explained previously with regard to FIG. 10A, the root node 502n does not comprise a second region flag (R2 flag) and from the first level leaf nodes 512n to 518n, only the second first level node or partition 514n comprises a "1" to indicate that this partition is assigned to the second region. Similar to the first region, the second region could be completely described by a partitioning flag tree specific to the second region and the region flag tree as shown in FIG. 10B. In other words, according to certain embodiments, each region can be defined by an individual partitioning flag tree and an individual region flag tree. In other embodiments, several regions might share the partitioning flag tree and the region flag tree, wherein the region flag tree comprises, for example, for each region, an individual flag. FIG. 10C shows such a joint or common region flag tree for the first region and the second region according to FIG. 9C, wherein the flag before the semicolon represents the first region flag (R1 flag) and the value after the semicolon represents the second region flag (R2 flag). In such an embodiment, the partition flag tree according to FIG. 5B could be used as the joint or common partition flag tree.

According to further embodiments of the decoder as shown in FIG. 2, the extractor 250 is adapted to receive the data stream 152 and to extract the second subset of syntax elements comprising, for example, the filter indication information and the associated regional indication information, for example, a first filter indication information specifying a first filter or first set of filter coefficients and the corresponding first region indication information specifying the assignment of the samples of the reconstructed picture to the first filter indication information, and the second filter indication information and the associated second region indication information and to output this side information to the in-loop filter stage 270 or the post-filter stage 270'. The filter stage 270, 270' again is adapted to sub-divide the reconstructed picture into the first region and the first residual region (according to the first region indication information) and to apply the first set of filter coefficients (specified by the first filter indication information) only to the first region of the reconstructed picture to produce a first filtered version of the reconstructed picture and to sub-divide the first filtered version of the reconstructed version of the picture into the second region R2 and the complementary second remaining region R2r to apply the second set of filter coefficients only to the second region of the first filtered version of the reconstructed version of the picture.

In case only these two filters F1 and F2 are applied to the reconstructed picture, the second filtered version of the reconstructed version of the picture is output, for example, to a display and forms the decoded picture 202 output by the decoder 200 (in contrast to the pre-decoded picture which corresponds to the reconstructed or deblocked reconstructed version of the picture and which would correspond to the output of conventional decoders that do not comprise embodiments of the filter stage and which is typically not output by embodiments of the encoders or decoders described herein).

In further embodiments, more than two filters can be applied to generate a third, fourth, etc. filtered version of the reconstructed version of the picture, which is output as the decoded version of the picture 202.

In general, the explanations given with regard to the encoder 100 apply in a corresponding manner to the decoder 200. In the following some aspects are repeated, however, with focus on the decoder. Although these embodiments will primarily be described for two-filter-embodiments, the explanations apply correspondingly to embodiments using further (third, fourth, etc) filters and associated regions.

According to further developments of embodiments of the decoder, the first region R1 and the second region R2 may spatially overlap. Embodiments of the decoder may further use a one-dimensional first filters or one-dimensional second filters. In addition the filter indication information may comprise a first filter indication information defining the first filter as first one-dimensional filter and may further comprise a second filter indication information defining the second filter as second one-dimensional filter.

According to further developments of embodiments of the decoder, the first filter indication information further comprises an information defining a direction of the first one-dimensional filter and/or the second information comprises an information defining a direction of the second one-dimensional filter, wherein the first direction is different from the second direction.

In alternative embodiments of the decoder, the filter indication information may comprise a first filter indication information defining the first filter as first two-dimensional filter and/or may further comprise a second filter indication information defining the second filter as second two-dimensional filter. In other words the filter indication information may define two one-dimensional filters, two two-dimensional filters or a mix of a one-dimensional filter and a two-dimensional filter. The same applies for any further filter and region, wherein the filter indication information may comprise a third or further filter indication information defining the third (or further filter) as one-dimensional filter (in this case the third or further filter indication information may also define the orientation of the one-dimensional filter) or as two-dimensional filter.

According to further developments of embodiments of the decoder, the filter indication information further comprises information associating at least one filter coefficient of a first set of filter coefficients to at least two filter taps of the first filter or information associating at least one filter coefficient of a second set of filter coefficients to at least two filter taps of the second filter. This re-use of filter coefficients for different filter taps reduces—independent of any symmetry of the filter and independent of whether the filter coefficient itself or only a residual of the filter coefficient is transmitted—the amount of information, i.e. the number of different filter coefficients, that need to be transmitted, and applies to one-dimensional and two-dimensional filters.

According to further developments of embodiments of the decoder, the filter indication information defines the first filter as symmetric first filter with a symmetric association of filter coefficients of a first set of filter coefficients to filter taps of the first filter, or the second filter as symmetric second filter with a symmetric association of filter coefficients of a second set of filter coefficients to filter taps of the second filter. The use of symmetric filters can be regarded as a specific case of the re-use of filter coefficients as described in the previous paragraph.

According to further developments of embodiments of the decoder, the filter indication information comprises only a first filter index information associating the first filter with first predetermined filter of a plurality of predetermined filters, wherein the first predetermined filter is uniquely identified by the filter index and the first filter is fully specified by the first filter index, or a second filter index information associating the second filter with a second predetermined filter of a plurality of predetermined filters, wherein the second predetermined filter is uniquely identified by the filter index and the second filter is fully specified by the second filter index, and wherein the filter stage 270, 270' is adapted to apply the first predetermined filter to the first region and the second predetermined filter to the second region. Thus, the additional information that needs to be transmitted to allow the decoder to apply the filter, which was determined by the encoder to be the best filter to minimize the rate distortion, is minimized as it only comprises the corresponding filter index. Both the encoder and the decoder may have a storage means to store the filter indices and filters associated to these indices, wherein the stored filter information may comprise any further information needed to define the filter, e.g. whether it is a one-dimensional filter or a two-dimensional filter, in case of a one-dimensional filter for example also the filter direction, the association of filter coefficients to filter taps, etc. The filter indices and associated filters may be static fixed information which is stored once, e.g., during the production, in a read only memory (ROM) or any other non-volatile memory of the encoder or decoder and is not changed during the operation or life time of the encoder or decoder, or may be defined and stored dynamically during the normal operation of the encoder and decoder in a random access memory (RAM) or any other re-programmable memory (volatile or non-volatile). The encoder, for example, can be adapted to define at the beginning of the encoding and/or signaling of a picture a filter including any further needed information to specify the filter and to transmit once this filter information together with the filter index the encoder associates to this filter to the decoder. The decoder will store the index and the filter information. Afterwards, the encoder needs only to send this filter index and the decoder will be able to apply the correct filter to the corresponding region. The encoder may also update the filter corresponding to a specific filter index by again sending the index and sending other filter data specifying now a different filter for this filter index. These static or dynamically defined pre-determined filters can be re-used for other regions of the same picture (the same or different planes of the same picture), or for other pictures.

According to further developments of embodiments of the decoder, the filter indication information comprises a first filter index information associating the first filter F1 with a first predetermined filter structure of a plurality of predetermined filter structures, wherein the first predetermined filter structure is uniquely identified by the filter index, and wherein the filter indication information further comprises a first set of filter coefficients and an association information associating filter coefficients of the first set of filter coefficients to filter taps of the first predetermined filter type, and wherein the filter stage 270, 270' is adapted to apply the first filter using the first filter structure and the first set of filter coefficients. These embodiments allow more flexibility with regard to the choice of filter coefficients compared to the embodiments described above, which use the filter coefficients as specified by the filter index, while at the same reducing (compared to signaling the complete information needed to define a filter) the information needed to define the complete filter by indexing pre-determined (statically or dynamically defined, see the corresponding explanations in the previous paragraph) filter structures, which define, e.g. whether the filter is a one-dimensional filter or a two-dimensional filter, the direction of a one-dimensional filter, and the association of filter coefficients (e.g. defined in the filter indication information by filter coefficient indices i, see FIGS. 3A to 3C) to the filter taps (e.g. defined by the filter tap coefficients j).

According to further developments of embodiments of the decoder, the filter indication comprises a first filter index information associating the first filter F1 with a first predetermined filter of a plurality of predetermined filter structures, wherein the first predetermined filter is uniquely identified by the filter index and comprises for each filter tap a given filter coefficient value, and wherein the filter indication information further comprises a residual value associated to the first filter, and wherein the filter stage is adapted to add the residual value to at least one of the filter coefficient values of the first filter. This embodiment allows to reduce (e.g. compared to the embodiments described in the previous paragraph) the amount of information that needs to be transmitted for defining one, several or all filter coefficients of a set of filter coefficients associated to a filter structure to define the complete filter. Embodiments of the encoder can be adapted to determine the residual to a statically or dynamically predetermined reference filter coefficient of the same filter or filter structure, or the residual to a filter coefficient of another filter used for a different region or different plane for the same picture, or for the same region, different region or different plane of a different picture. The filter indication information comprises, e.g., in addition to the residual the corresponding information to define this other filter, e.g. an index of the filter or information specifying the region, plane and/or picture the filter is associated to.

According to further developments of embodiments of the decoder, the extractor is adapted to extract the second subset of syntax elements 170c comprising filter indication information defining a third filter F3 for a third region R3 of at least two different regions of the picture, and the filter stage 270, 270' is adapted to apply the third set F3 of filter coefficients to the third region R3 of the second filtered version of the reconstructed version of the picture to obtain a third filtered version of the reconstructed version of the picture.

According to further developments of embodiments of the decoder, the second subset of syntax elements comprises a region indication information defining the first region R1 and the second region R2.

According to further developments of embodiments of the decoder, the region indication information defines a granularity of the first region or the second region. The granularity of the second region can be different from the granularity of the first region. Determining the region at variable granularity or partitioning levels allows to increase the granularity (i.e. reduce the size of the partitions or sub-partitions and, thus, the resolution) of the region locally, i.e. only where it is beneficial (e.g. with regard to the rate-distortion), and to stay at a low granularity level (i.e. at partitions or sub-partitions with larger sizes) at other parts of the region.

According to further developments of embodiments of the decoder, the region indication information comprises a tree-partitioning information, e.g. a quadtree partitioning information, to define the first region or the second region and to define a granularity of the first region or second region.

According to further developments of embodiments of the decoder, the tree partitioning information comprises a partitioning tree information, defining for each partition of the picture, whether a partition of the picture is to be further partitioned, and a region tree information, defining, for example, for each partition or only for each leaf partition, whether it is assigned to the first region.

Figure 10C:
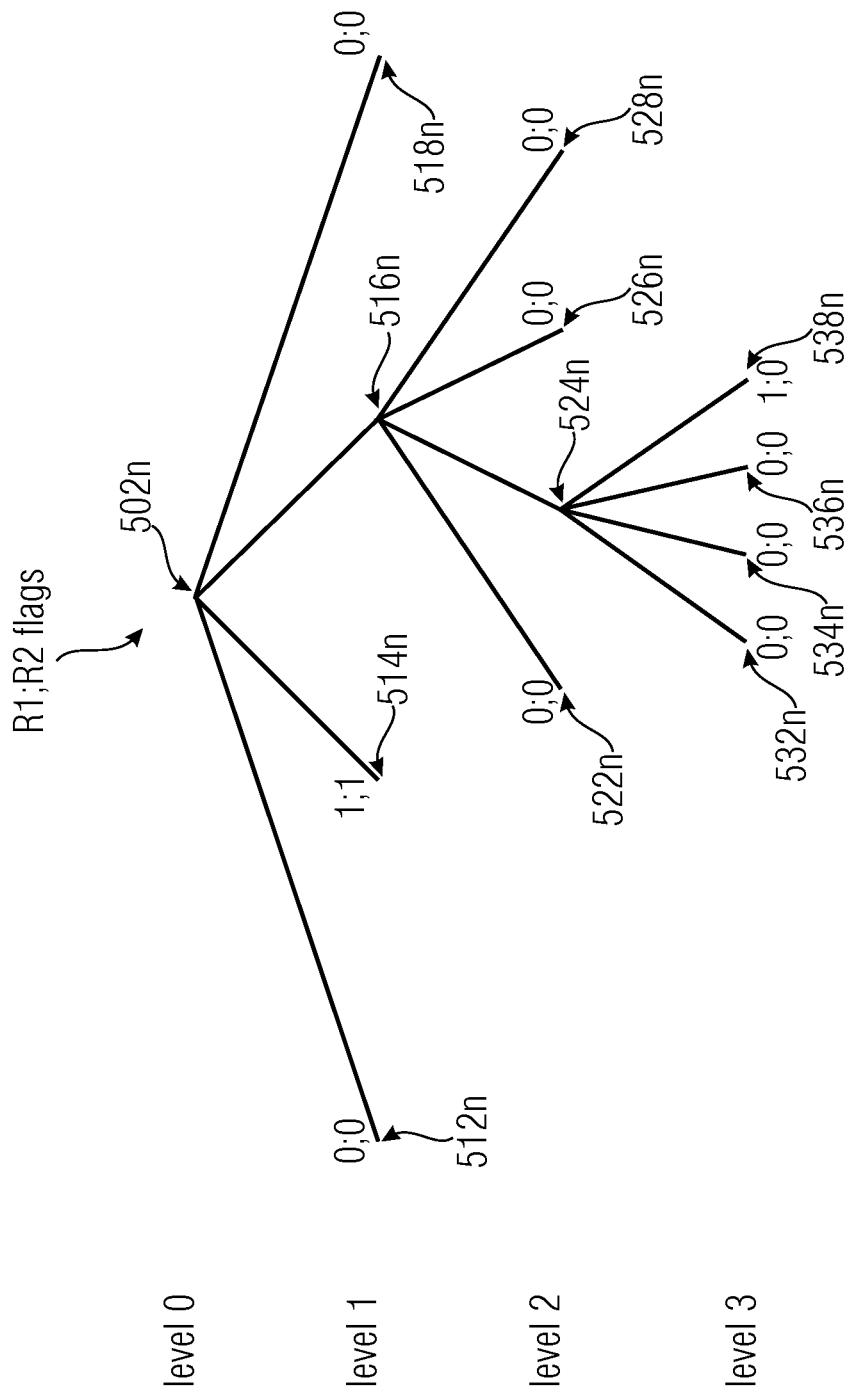

According to further developments of embodiments of the decoder, the region indication information comprises a joint tree-partitioning information jointly defining the first region and the second region (see FIGS. 5D and 10C).

According to further developments of embodiments of the decoder, the region indication information comprises a first tree-partitioning information (see FIG. 10A) defining the first region and a second tree-partitioning information (see FIG. 10B) defining the second region.

According to further developments of embodiments of the decoder, the pre-decoder comprises a predictor 140 for inter-picture prediction adapted to obtain a prediction of a following picture by use of interpolation filtering based on the second filtered version 170b of the reconstructed picture.

According to further developments of embodiments of the decoder, the first subset of syntax elements comprises information 140c defining a prediction granularity, and the second subset of syntax elements comprises information 170c about a granularity of the first region or the second region.

According to further developments of embodiments of the decoder, a prediction granularity used by a predictor 140 of the pre-decoder is finer than a granularity of the first or second region. The prediction is, for example, performed on a macro-block-granularity level. In further embodiments a predetermined minimum partitioning size (or a corresponding predetermined maximum partitioning level Lx or predetermined maximum granularity level) can be defined and contained in the regional indication information, wherein the minimum partitioning size is larger than the prediction granularity, e.g. at the macro-block level. In such embodiments—independent of possible further rate distortion gains—no further partitioning is performed (see e.g. step 740 in FIGS. 7A and 7B) in case the maximum partitioning level (corresponding to the minimum partitioning size or maximum granularity or resolution) is reached.

According to further developments of embodiments of the decoder, a granularity of the first region or the second region is independent from a granularity used by a predictor of the pre-decoder. In other words, the maximum partitioning size of the tree root partitions and the further partitioning (including the resulting minimum partitioning size obtained thereby) of the tree root partitions determined during the optimization is independent from the prediction granularity. In certain cases the minimum partitioning size determined by the optimization process may even be the same as the prediction granularity, or even smaller (in case the predetermined minimum partitioning size is equal or smaller than the partitioning granularity, or in case no predetermined minimum partitioning size is given).

According to further developments of embodiments of the decoder, the decoder is adapted to output the second filtered version of the reconstructed version of the picture or any other filtered version of the reconstructed version of the picture produced by the filter stage as decoded picture.

According to further developments of embodiments of the decoder, the extractor 250 is adapted to extract for a first region a first maximum partitioning size and a first tree-partitioning information from the data stream, wherein the filter stage 270, 270' is adapted to spatially partition a plane of reconstructed information samples representing the reconstructed version of the picture into first tree root partitions of the first maximum partitioning size and to further first partitions, in accordance with the first tree-partitioning information, at least a subset of the first tree root partitions into smaller, simply-connected first partitions of different sizes by recursively partitioning the subset of first tree root partitions, wherein the filter stage 270, 270' is further adapted to assign the first partitions to the first region R1 or to a first remaining region R1r of the reconstructed version of the picture depending on the first tree-partitioning information.

According to further developments of embodiments of the decoder, the extractor 250 is adapted to extract a second maximum partitioning size and a second tree-partitioning information from the data stream, wherein the filter stage 270, 270' is adapted to spatially partition a plane of first filtered information samples representing the first filtered version of the reconstructed version of the picture into second tree root partitions of the second maximum partitioning size and to further partition, in accordance with the second tree-partitioning information, at least a subset of the second tree root partitions into smaller, simply-connected second partitions of different sizes by recursively partitioning the subset of second tree root partitions, wherein the filter stage 270, 270' is further adapted to assign the second partitions to the second region (R1) or to a second remaining region (R1r) of the reconstructed version of the picture depending on the second tree-partitioning information.

The following applies to the first and second tree partitioning information, and the partitioning information for further regions, and the related aspects.

According to further developments of embodiments of the decoder, the filter stage 270, 270' is adapted to perform the partitioning of the plane of information samples into tree root partitions (first and/or second tree root partitions) such that the tree root partitions are rectangular blocks of a size determined by the maximum partitioning size, regularly arranged in order to cover the plane of information samples without a gap between the tree root partitions.

According to further developments of embodiments of the decoder, the filter stage is configured, in partitioning the subset of tree root partitions (first and/or second tree root partitions), to check for each tree root partition, the tree partitioning information as to whether the respective tree root partition is to be partitioned and if the respective tree root partition is to be partitioned, partition the respective tree root partition into partitions of a first hierarchy level L1 according to a partition rule associated with the first hierarchy level and to recursively repeat the check and partitioning for the partitions of the first hierarchy level in order to obtain partitions of higher-order hierarchy levels (L2, L3, etc) using partition rules associated therewith, with stopping the recursive repetition where no further partitioning is to be performed according to the tree-partitioning information or a maximum hierarchy level or partitioning level is reached, wherein partitions of the subset of tree root partitions not further partitioned in accordance with the tree-partitioning information, represent the smaller, simply-connected partitions and the leaf partitions of the tree-partitioning, respectively.

According to further developments of embodiments of the decoder, the extractor is configured to also extract the maximum hierarchy level or a corresponding minimum partitioning size from the data stream.

According to further developments of embodiments of the decoder, the filter stage is configured to, in accordance with the partition rules associated with the first hierarchy level L1 and higher-order hierarchy levels L2, L3, etc, perform a partition into sub-partitions of equal size, the number of sub-partitions being common to all hierarchy levels.

According to further developments of embodiments of the decoder, the extractor 250 is configured to extract a second subset syntax elements associated with leaf regions of the subset of tree root partitions in accordance with the tree-partitioning information in a depth-first traversal order from the data stream 152.

According to further developments of embodiments of the decoder, the tree-partitioning information has a partition indication flag associated with each tree root partition (corresponding to a root hierarchy level L0) and partitions of the first L1 and higher-order hierarchy levels L2, L3, etc, not belonging to the regions of the maximum hierarchy level, respectively, the partition indication flags indicating as to whether the associated tree root partition and partition of the first and higher-order hierarchy level is to be partitioned and wherein the extractor is configured to decode the partitioning indication flags in a depth-first traversal order defined among the associated tree root partitions and regions of the first and higher-order hierarchy levels.

According to further developments of embodiments of the decoder, the filter stage 270, 270' is adapted to spatially partition the reconstructed picture using a quadtree partitioning (partition a plane of information samples representing a spatially-sampled information signal into blocks of different sizes by recursively quadtree-partitioning).

Further embodiments of the invention may use instead of blocks or macroblocks any other partition and may use instead of the quadtree structures other tree-structures or any means to define the regions the quadtree structures.

In certain embodiments the first or second region can be determined independent from the determination of the first or second filter and the respective sets of filter coefficients, for example based on contour or edge detection algorithms, on object detection algorithms or on other information already present in the first subset of syntax elements, e.g. based on slice group borders.

Although the invention has been particularly described based on video coding schemes, embodiments of the invention may also be used for still image coding, wherein the considerations explained with regard to the video coding apply correspondingly.

Although the invention has been particularly described based on embodiments of encoders and decoders the above explanations equally apply to the corresponding embodiments of methods for encoding and decoding and for embodiments of the corresponding data streams produced by such encoders and received by such decoders.

Depending on certain implementation requirements of the inventive methods, the inventive methods can be implemented in hardware or in software. The implementation can be performed using a digital storage medium, in particular, a disc, a CD, a DVD or a Blue-Ray disc having an electronically-readable control signal stored thereon or which co-operates with a programmable computer system such that an embodiment of the inventive method is performed. In general, an embodiment of the present invention is, therefore, a computer program produced with a program code stored on a machine-readable carrier, the program code being operated for performing the inventive method when the computer program product runs on a computer. In other words, embodiments of the inventive method are, therefore, a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Decoder for decoding a picture, comprising:
   an extractor adapted to extract a first subset of syntax elements from a received data stream and a second subset of syntax elements being disjoint from the first subset of syntax elements, wherein the second subset of syntax elements comprises
      a region indication information comprising a first tree-partitioning information defining a first region of at least two different regions of the picture and a second tree-partitioning information defining a second region of the at least two different regions such that the picture is sub-divided into regions R1, R2, R3 and R4 with the first region being a combination of regions R1 and R3 and the second region being a combination of regions R2 and R3, and the first and second regions spatially overlap in R3, and filter indication information defining a first filter for the first region and a second filter for the second region;

a pre-decoder adapted to pre-decode the picture based on the first subset of syntax elements to produce a reconstructed version of the picture; and a filter stage adapted to apply the first filter to the first region of the reconstructed picture to acquire a first filtered version of the reconstructed version of the picture and to apply the second filter to the second region of the first filtered version of the reconstructed version of the picture, with applying neither the first nor the second filter to region R4, to acquire a second filtered version of the reconstructed version of the picture.

2. Decoder according to claim 1, wherein the first filter indication information further comprises an information defining a direction of the first one-dimensional filter and/or the second information comprises an information defining a direction of the second one-dimensional filter, wherein the first direction is different from the second direction.

3. Decoder according to claim 2, wherein the first direction is a vertical direction and the second direction is a horizontal direction or vice versa.

4. Decoder according to claim 1, wherein the filter indication information further comprises information associating at least one filter coefficient of a first set of filter coefficients to at least two filter taps of the first filter or information associating at least one filter coefficient of a second set of filter coefficients to at least two filter taps of the second filter.

5. Decoder according to claim 1, wherein the filter indication information defines the first filter as symmetric first filter with a symmetric association of filter coefficients of a first set of filter coefficients to filter taps of the first filter, or the second filter as symmetric second filter with a symmetric association of filter coefficients of a second set of filter coefficients to filter taps of the second filter.

6. Decoder according to claim 5, wherein the first filter or the second filter is symmetric to its center.

7. Decoder according to claim 1, wherein the filter indication information comprises only a first filter index information associating the first filter with first predetermined filter of a plurality of predetermined filters, wherein the first predetermined filter is uniquely identified by the filter index and the first filter is fully specified by the first filter index, or a second filter index information associating the second filter with a second predetermined filter of a plurality of predetermined filters, wherein the second predetermined filter is uniquely identified by the filter index and the second filter is fully specified by the second filter index, and wherein the filter stage is adapted to apply the first predetermined filter to the first region and the second predetermined filter to the second region.

8. Decoder according to claim 1, wherein the filter indication information comprises a first filter index information associating the first filter with a first predetermined filter structure of a plurality of predetermined filter structures, wherein the first predetermined filter structure is uniquely identified by the filter index, and wherein the filter indication information further comprises a first set of filter coefficients and an association information associating filter coefficients of the first set of filter coefficients to filter taps of the first predetermined filter type, and wherein the filter stage is adapted to apply the first filter using the first filter structure and the first set of filter coefficients.

9. Decoder according to claim 1, wherein the filter indication information comprises a first filter index information associating the first filter with a first predetermined filter of a plurality of predetermined filter structures, wherein the first predetermined filter is uniquely identified by the filter index and comprises for each filter tap a given filter coefficient value, and wherein the filter indication information further comprises a residual value associated to the first filter, and wherein the filter stage is adapted to add the residual value to at least one of the filter coefficient values of the first filter.

10. Decoder according to claim 1, wherein the extractor is adapted to extract the second subset of syntax elements comprising filter indication information defining a third filter for a third region of at least two different regions of the picture, and wherein the filter stage is adapted to apply the third set of filter coefficients to the third region of the second filtered version of the reconstructed version of the picture to acquire a third filtered version of the reconstructed version of the picture.

11. Decoder according to claim 1, wherein the pre-decoder comprises:

a predictor for inter-picture prediction adapted to acquire a prediction of a following picture by use of interpolation filtering based on the second filtered version of the reconstructed picture.

12. Decoder according to claim 11, wherein the first subset of syntax elements comprises information defining a prediction granularity, and the second subset of syntax elements comprises information about a granularity of the first region or the second region.

13. Decoder according to claim 11, wherein a prediction granularity used by a predictor of the pre-decoder is finer than a granularity of the first or second region.

14. Decoder according to claim 11, wherein a granularity of the first region or the second region is independent from a granularity used by a predictor of the pre-decoder.

15. Decoder according to claim 1, wherein the decoder is adapted to output the second filtered version of the reconstructed version of the picture or any other filtered version of the reconstructed version of the picture produced by the filter stage as decoded picture.

16. Decoder according to claim 1, wherein the filter stage is an in-loop filter stage arranged in a prediction-loop of the decoder, or a post filter stage.

17. Decoder according to claim 1, wherein the second subset of syntax elements comprises a region indication information defining a first region of at least two different regions of the picture and a second region of the at least two different regions such that the first region and the second region spatially overlap.

18. Decoder according to claim 1, wherein the first filter is a horizontal one-dimensional filter and the second filter is a vertical one-dimensional filter.

19. A non-transitory computer-readable medium storing a computer program comprising a program code for performing a method, when the program runs on a computer, for decoding a picture, comprising:

extracting a first subset of syntax elements from a received data stream and a second subset of syntax elements being disjoint from the first subset of syntax elements, wherein the second subset of syntax elements comprises region indication information comprising first tree-partitioning information defining a first region of at least two different regions of the picture and a second tree-partitioning information defining a second region of the at least two different regions such that the picture is sub-divided into regions R1, R2, R3 and R4 with the first region being a combination of regions R1 and R3 and the second region being a combination of regions R2 and R3, and the first and second regions spatially overlap in R3, and filter indication information defining a first filter for the first region and a second filter for the second region;

pre-decoding the picture based on the first subset of syntax elements to produce a reconstructed version of the picture;

applying the first filter to the first region of the reconstructed picture to acquire a first filtered version of the reconstructed version of the picture; and applying the second filter to the second region of the first filtered version of the reconstructed version of the picture to acquire a second filtered version of the reconstructed version of the picture, wherein neither the first filter nor the second filter is applied to the region R4.

20. Encoder for encoding a picture, comprising:

a pre-encoder adapted to pre-encode the picture into a first subset of syntax elements of a data stream;

a filter stage adapted to subdivide the picture into at least two different regions; and a data stream inserter adapted to insert into the data stream a second subset of syntax elements being disjoint from the first subset of syntax elements, wherein the second subset of syntax elements comprises a region indication information comprising a first tree-partitioning information defining a first region of at least two different regions of the picture and a second tree-partitioning information defining a second region of the at least two different regions such that the picture is sub-divided into regions R1, R2, R3 and R4 with the first region being a combination of regions R1 and R3 and the second region being a combination of regions R2 and R3, and the first and second regions spatially overlap in R3, and filter indication information defining a first filter for the first region and a second filter for the second region.

21. Encoder according to claim 20, wherein the filter stage is adapted to determine the first filter and the first region jointly by minimizing a rate distortion function associated with a filtered version of the reconstructed picture filtered with the first filter at the first region.

22. Encoder according to claim 21, wherein the filter stage is adapted to only pass the filter indication information to the data stream inserter in case the rate distortion associated to the first filter and the first region is lower than a rate distortion associated to the reconstructed picture.

23. Encoder according to claim 21, wherein the filter stage is adapted to determine the first region by minimizing a rate distortion associated with a preliminary first filtered version of the reconstructed picture acquired by filtering the whole reconstructed picture with a preliminary first filter, and is adapted to determine the first filter based on minimizing a deviation between the original picture and the reconstructed picture only considering the first region.

24. Encoder according to claim 21, wherein the filter stage is adapted to determine the first filter and the first region by selecting a filter of a plurality of predetermined filters and a region associated to the filter with a minimum rate distortion.

25. Encoder according to claim 20, wherein the filter stage is an in-loop filter stage arranged in a prediction-loop of the encoder, or a post filter stage.

26. Encoder according to claim 20, wherein the second subset of syntax elements comprises a region indication information defining a first region of at least two different regions and a second region of the at least two different regions such that the first region and the second region spatially overlap.

27. Encoder according to claim 20, wherein the first filter is a horizontal one-dimensional filter and the second filter is a vertical one-dimensional filter.

28. Method for decoding a picture, comprising:

extracting a first subset of syntax elements from a received data stream and a second subset of syntax elements being disjoint from the first subset of syntax elements, wherein the second subset of syntax elements comprises region indication information comprising first tree-partitioning information defining a first region of at least two different regions of the picture and a second tree-partitioning information defining a second region of the at least two different regions such that the picture is sub-divided into regions R1, R2, R3 and R4 with the first region being a combination of regions R1 and R3 and the second region being a combination of regions R2 and R3, and the first and second regions spatially overlap in R3, and filter indication information defining a first filter for the first region and a second filter for the second region; and pre-decoding the picture based on the first subset of syntax elements to produce a reconstructed version of the picture;

applying the first filter to the first region of the reconstructed picture to acquire a first filtered version of the reconstructed version of the picture; and applying the second filter to the second region of the first filtered version of the reconstructed version of the picture to acquire a second filtered version of the reconstructed version of the picture, wherein neither the first nor the second filter is applied to region R4.

29. Method according to claim 28, wherein the first filter is a horizontal one-dimensional filter and the second filter is a vertical one-dimensional filter.

30. Method for encoding a picture, comprising:

pre-encoding the picture into a first subset of syntax elements of a data stream;

subdividing the picture into at least two different regions; and inserting into the data stream a second subset of syntax elements being disjoint from the first subset of syntax elements, wherein the second subset of syntax elements comprises a region indication information comprising a first tree-partitioning information defining a first region of at least two different regions of the picture and a second tree-partitioning information defining a second region of the at least two different regions such that the picture is sub-divided into regions R1, R2, R3 and R4 with the first region being a combination of regions R1 and R3 and the second region being a combination of regions R2 and R3, and the first and second regions spatially overlap in R3, and filter indication information defining a first filter for the first region and a second filter for the second region.

31. Method according to claim 30, wherein the first filter is a horizontal one-dimensional filter and the second filter is a vertical one-dimensional filter.

32. The non-transitory computer-readable medium storing a data stream comprising:

a first subset of syntax elements comprising data of a pre-encoded version of a picture; and a second subset of syntax elements being disjoint from the first subset of syntax elements and comprising a region indication information comprising a first tree-partitioning information defining a first region of at least two different regions of the picture and a second tree-partitioning information defining a second region of the at least two different regions such that the picture is sub-divided into regions R1, R2, R3 and R4 with the first region being a combination of regions R1 and R3 and the second region being a combination of regions R2 and R3, and the first and second regions spatially overlap in R3, and filter indication information defining a first horizontal one-dimensional filter for the first region and a second vertical one-dimensional filter for the second region.

33. The non-transitory computer-readable medium according to claim 32 wherein the first filter is a horizontal one-dimensional filter and the second filter is a vertical one-dimensional filter.

34. A non-transitory computer-readable medium storing a computer program comprising a program code for performing a method, when the program runs on a computer, for encoding a picture, comprising:

pre-encoding the picture into a first subset of syntax elements of a data stream;

subdividing the picture into at least two different regions; and inserting into the data stream a second subset of syntax elements being disjoint from the first subset of syntax elements, wherein the second subset of syntax elements comprises a region indication information comprising a first tree-partitioning information defining a first region of at least two different regions of the picture and a second tree-partitioning information defining a second region of the at least two different regions such that the picture is sub-divided into regions R1, R2, R3 and R4 with the first region being a combination of regions R1 and R3 and the second region being a combination of regions R2 and R3, and the first and second regions spatially overlap in R3, and filter indication information defining a first filter for the first region and a second filter for the second region.

* * * * *